United States Patent
Ishizaki

(10) Patent No.: US 10,742,444 B2
(45) Date of Patent: Aug. 11, 2020

(54) COMMUNICATION SYSTEM INCLUDING MULTIPLE RING NETWORKS AND ROBOT INCLUDING THE COMMUNICATION SYSTEM

(71) Applicant: HONDA MOTOR CO., LTD., Minato-ku, Tokyo (JP)

(72) Inventor: Ryusuke Ishizaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/213,216

(22) Filed: Dec. 7, 2018

(65) Prior Publication Data

US 2019/0190745 A1 Jun. 20, 2019

(30) Foreign Application Priority Data

Dec. 19, 2017 (JP) .................................. 2017-242737

(51) Int. Cl.
*H04L 12/423* (2006.01)
*H04L 12/437* (2006.01)
*H04L 12/42* (2006.01)

(52) U.S. Cl.
CPC .......... *H04L 12/423* (2013.01); *H04L 12/437* (2013.01); *H04L 2012/421* (2013.01)

(58) Field of Classification Search
CPC ................. H04L 12/423; H04L 12/437; H04L 2012/421; H04L 1/22; H04L 41/0663; H04Q 2011/0081; H04Q 2011/0092; H04Q 2011/009; H04J 3/085; H04J 14/0295
See application file for complete search history.

(56) References Cited

U.S. PATENT DOCUMENTS

| | | | |
|---|---|---|---|
| 6,295,146 B1 * | 9/2001 | Nathan | H04L 1/22 370/228 |
| 7,894,336 B2 * | 2/2011 | Monse | G05B 19/0428 370/222 |
| 2002/0024931 A1 * | 2/2002 | Chikazawa | H04L 1/22 370/228 |
| 2016/0380835 A1 | 12/2016 | Ishizaki | |
| 2017/0272272 A1 | 9/2017 | Ishizaki | |

FOREIGN PATENT DOCUMENTS

JP 5635029 B2 12/2014

* cited by examiner

*Primary Examiner* — Chi H Pham
*Assistant Examiner* — Ji-Hae Yea
(74) *Attorney, Agent, or Firm* — Armstrong Teasdale LLP

(57) ABSTRACT

In a communication system including multiple ring networks, each ring network comprises: a host node serving as an upper controller for the other nodes in the own ring network, the host node being configured to be capable of communicating with another ring network; and a switch provided in the ring network and having multiple regular ports and multiple redundant ports, wherein the redundant communication ports of the switch in each ring network are connected to the redundant communication ports of the switch in the other ring network via redundant communication lines. When a communication error is detected in one ring network, the host node of the one ring network controls the switch of the own ring network and the switch of another ring network such that at least one node of the own ring network is incorporated in the other ring network via the switches and the redundant communication lines.

3 Claims, 19 Drawing Sheets

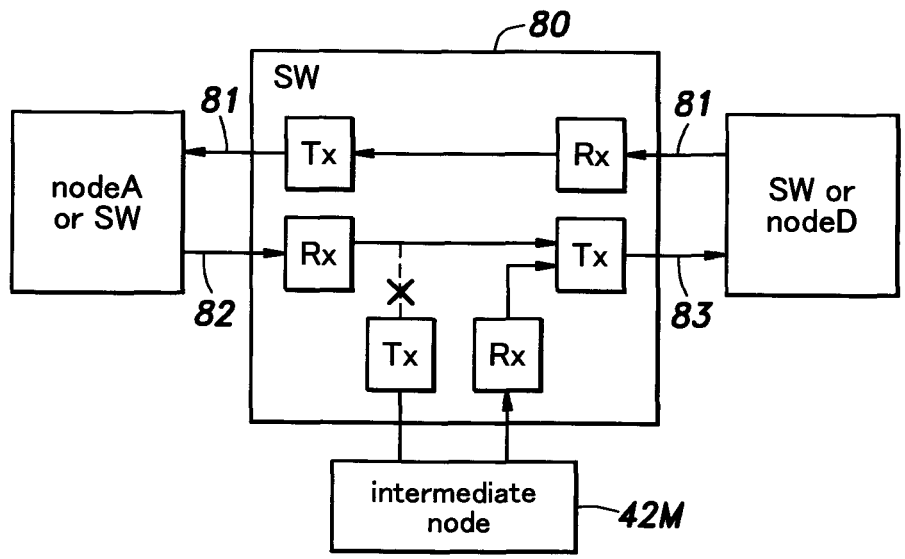
Fig.9A first switching state
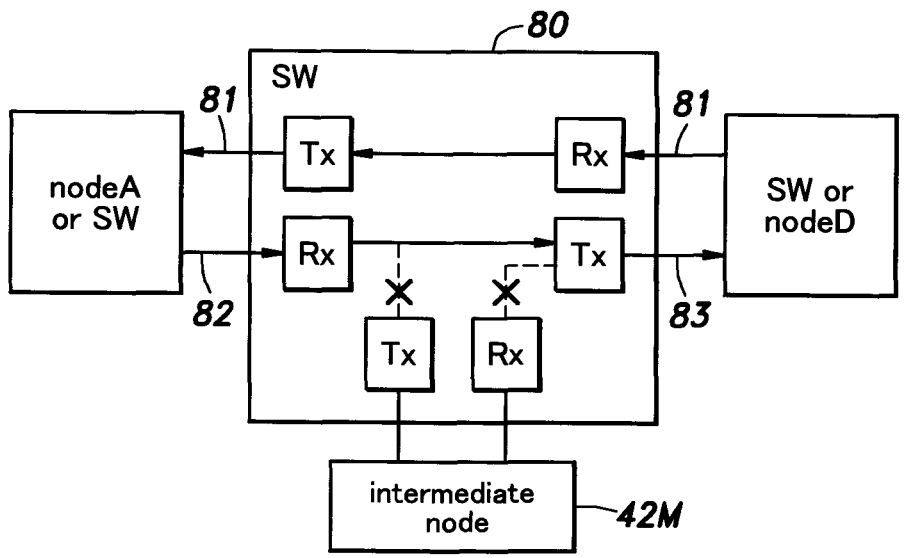
Fig.9B second switching state
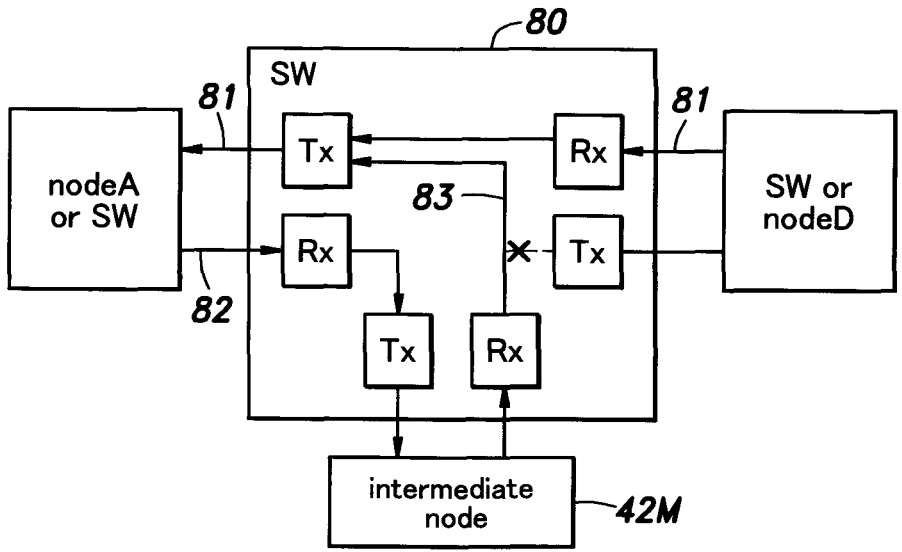
Fig.9C third switching state first switching state second switching state fourth switching state

US 10,742,444 B2

COMMUNICATION SYSTEM INCLUDING MULTIPLE RING NETWORKS AND ROBOT INCLUDING THE COMMUNICATION SYSTEM

TECHNICAL FIELD

The present invention relates to a communication system including a plurality of ring networks each having a plurality of nodes and a robot including such a communication system for controlling movements of parts thereof.

BACKGROUND ART

Networks connecting a plurality of terminals (nodes) such as computers may have various topologies such as bus, star, ring and mesh topologies. An example of a bus network is Ethernet (registered trademark). Ethernet has a physical star topology but has a logical bus topology, in which each node can freely transmit a signal (data). On the other hand, a signal collision may occur in Ethernet, and in such a case, delivery of the signal is delayed (namely, latency is increased).

Like Ethernet, ring-type networks (hereinafter, may be simply referred to as ring networks) often are wired in a physical star topology in which each network node is connected to a central hub. In ring networks, collision of data on the network does not occur, and the data transmitted onto the network is delivered to the destination node by being relayed from node to node. The final recipient of the transmission data may be the destination node or the source node (namely, there are two communication methods). In the communication method in which the transmission data is to be returned to the source node, the source node can confirm that the communication has been performed correctly by receiving the transmission data, and can know that there is a failure in the network when the data is not returned.

In the ring network, irrespective of which of the communication methods is used, if there is a failure in one communication node, it affects the entirety of the network system and may lead to a system failure. In addition, it is difficult to locate the part where the failure has occurred. It may be conceived to provide bypass switches such that when a failure occurs at a certain communication node, a corresponding bypass switch is operated to cut off the communication node where the failure has occurred. However, if a communication failure (such as a break of the communication line) occurs at a part near and downstream of one of the communication nodes that functions as an upper controller (upper communication node) for the other, the communication between the upper communication node and the other communication nodes in the ring network is prevented and thus the other communication nodes will become unable to operate properly; namely, the entirety of the network system can be affected significantly.

To minimize the affect on the system caused by a communication error, it is known to duplicate the communication lines in a ring network over the entirety of the network (see JP5635029B, for example).

However, when the communication lines are duplicated over the entirety of the ring network as in the invention described in JP5635029B, a work for routing the communication lines through narrow spaces such as joints of a robot can become difficult because four communication lines (two for communication in one direction and two for communication in the opposite direction) need to be passed through each joint. Further, in the case where duplicated communication lines are passed through a moving part such as a joint of a robot, the two communication lines passed through the same moving part can be broken simultaneously.

SUMMARY OF THE INVENTION

In view of such a background, an object of the present invention is to provide a communication system that can allow easy routing of the communication lines in narrow spaces and can reduce the affect on the system caused by a communication error occurring in the system, and to provide a robot including such a communication system.

To achieve such an object, one aspect of the present invention provides a communication system including a plurality of ring networks (40) each including a plurality of nodes (42) communicably connected to each other by communication lines (41), wherein each of the plurality of ring networks comprises: a host node (42A) serving as an upper controller for the other nodes (42B-42D) in the own ring network, the host node being configured to be capable of communicating with another ring network of the communication system; and a switch (80B) provided in the ring network and having a plurality of regular ports (85A-85C, 86A-86C) which are switchably connected to one another in the switch and are each connected with one of the communication lines and a plurality of redundant ports (85D, 86D) which are not connected to the regular ports in the switch at normal time, wherein the redundant communication ports of the switch in each ring network are connected to the redundant communication ports of the switch in the other ring network via redundant communication lines (87), wherein the host node in each ring network comprises a communication error detector (49) configured to detect a communication error in the own ring network, wherein the host node in each ring network is configured such that, when a communication error is detected by the communication error detector, the host node transmits a switch control signal (Ss) to the host node of the other ring network to control the switch of each of the own ring network and the other ring network to connect the redundant ports thereof to some of the regular ports thereof such that at least one node in the own ring network is incorporated in the other ring network via the redundant communication lines, and wherein the host node in each ring network is configured such that, when the host node receives the switch control signal from the host node of the other ring network, the host node transmits the received switch control signal to the switch in the own ring network to control the switch to connect the redundant ports thereof to some of the regular ports thereof and transmits the switch control signal to the other ring network to control the switch of the other ring network to connect the redundant ports thereof to some of the regular ports thereof such that at least one node of the other ring network is incorporated in the own ring network via the redundant communication lines In this arrangement, it is unnecessary to provide the redundant communication lines along the entire ring of each ring network, and therefore, the communication lines can be routed in narrow spaces easily. Further, when a communication error occurs in one ring network, at least one node in the one ring network is incorporated in another ring network via the switches provided in these ring networks and the redundant communication lines connecting the switches to each other, and therefore, the affect on the communication system caused by the communication error can be reduced.

According to another aspect of the present invention, there is provided a robot (1) comprising the above communication system and a plurality of parts (6) driven by the plurality of ring networks of the communication system.

In such a robot, when a communication error occurs in the communication system, the affect of the communication error on the robot can be minimized. Further, the communication lines of the communication system can be routed through narrow spaces of the robot (such as the joints of the robot) easily.

Preferably, the robot comprises a main body (2, 3) and a plurality of multi-link mechanisms (5, 6) each having a plurality of links (11-13) connected in series via a plurality of joints (25-27) such that one end of the series-connected links is joined to the main body, wherein the nodes (42) of each of the plurality of ring networks (40) are distributedly arranged on the main body and the plurality of links of a corresponding one of the plurality of multi-link mechanisms, and the switches (80B) and the redundant communication lines (87) of the plurality of ring networks are provided on the main body In this arrangement, because the redundant communication lines are provided on the main body, they can be routed easily. Further, when a communication error occurs in one ring network provided for one of the multi-link mechanisms, at least one node of the one ring network is incorporated in the ring network for another multi-link mechanism via the switches and the redundant communication lines provided on the main body, whereby the affect on the robot caused by the communication error can be reduced.

Thus, according to an aspect of the present invention, it is possible to provide a communication system that can allow easy routing of the communication lines in narrow spaces and can reduce the affect on the system caused by a communication error occurring in the system, and to provide a robot including such a communication system.

BRIEF DESCRIPTION OF THE DRAWINGS

FIGS. 9A, 9B, and 9C are explanatory diagrams respectively showing first, second, and third switching states that can be taken by each switch in the first ring network shown in FIG. 8;

DESCRIPTION OF THE PREFERRED EMBODIMENT(S)

In the following, an embodiment of a robot 1 to which the present invention is applied will be described with reference to the appended drawings.

Figure 1:
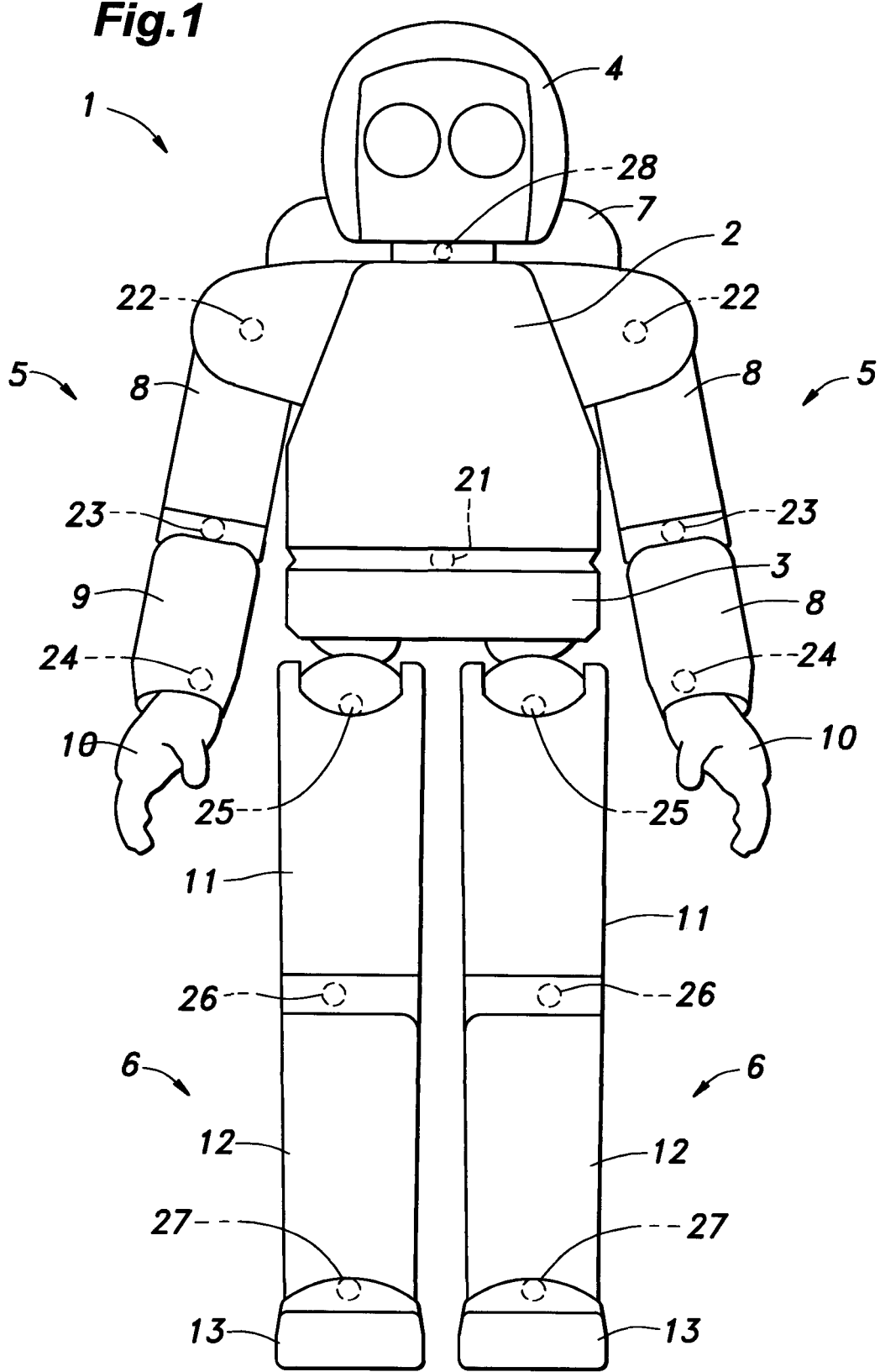
FIG. 1 is a front view of a robot according to an embodiment of the present invention.

As shown in FIG. 1, the robot 1 of the illustrated embodiment consists of a bipedal humanoid robot that can walk and run autonomously, and includes a torso 2, a hip 3, a head 4, left and right arms 5, and left and right legs 6. The torso 2 and the hip 3 constitute a main body. An electrical component box 7 is mounted on the back of the torso 2. Each of the arms 5 is a multi-link mechanism constituted of an upper arm 8, a forearm 9, and a hand 10 each serving as a link. Also, each of the legs 6 is a multi-link mechanism constituted of a thigh 11, a lower leg 12, and a foot 13 each serving as a link. The electrical component box 7 contains a battery, a DC-DC converter, etc. therein.

The torso 2 and the hip 3 are connected to each other via a waist joint 21. Further, the upper arm 8 is connected to the torso 2 via a shoulder joint 22, the upper arm 8 and the forearm 9 are connected to each other via an elbow joint 23, and the forearm 9 and the hand 10 are connected to each other via a wrist joint 24. On the other hand, the thigh 11 is connected to the hip 3 via a hip joint 25, the thigh 11 and the lower leg 12 are connected to each other via a knee joint 26, and the lower leg 12 and the foot 13 are connected to each other via an ankle joint 27. Namely, a plurality of links constituting the arm 5 or the leg 6 are connected in series and the series connected links is joined to the main body (torso 2 and hip 3) at one end thereof. The torso 2 and the head 4 are connected to each other via a neck joint 28. It is to be noted that in FIG. 1, an approximate center of each joint 21-28 is shown by a circle in broken line.

Figure 2:
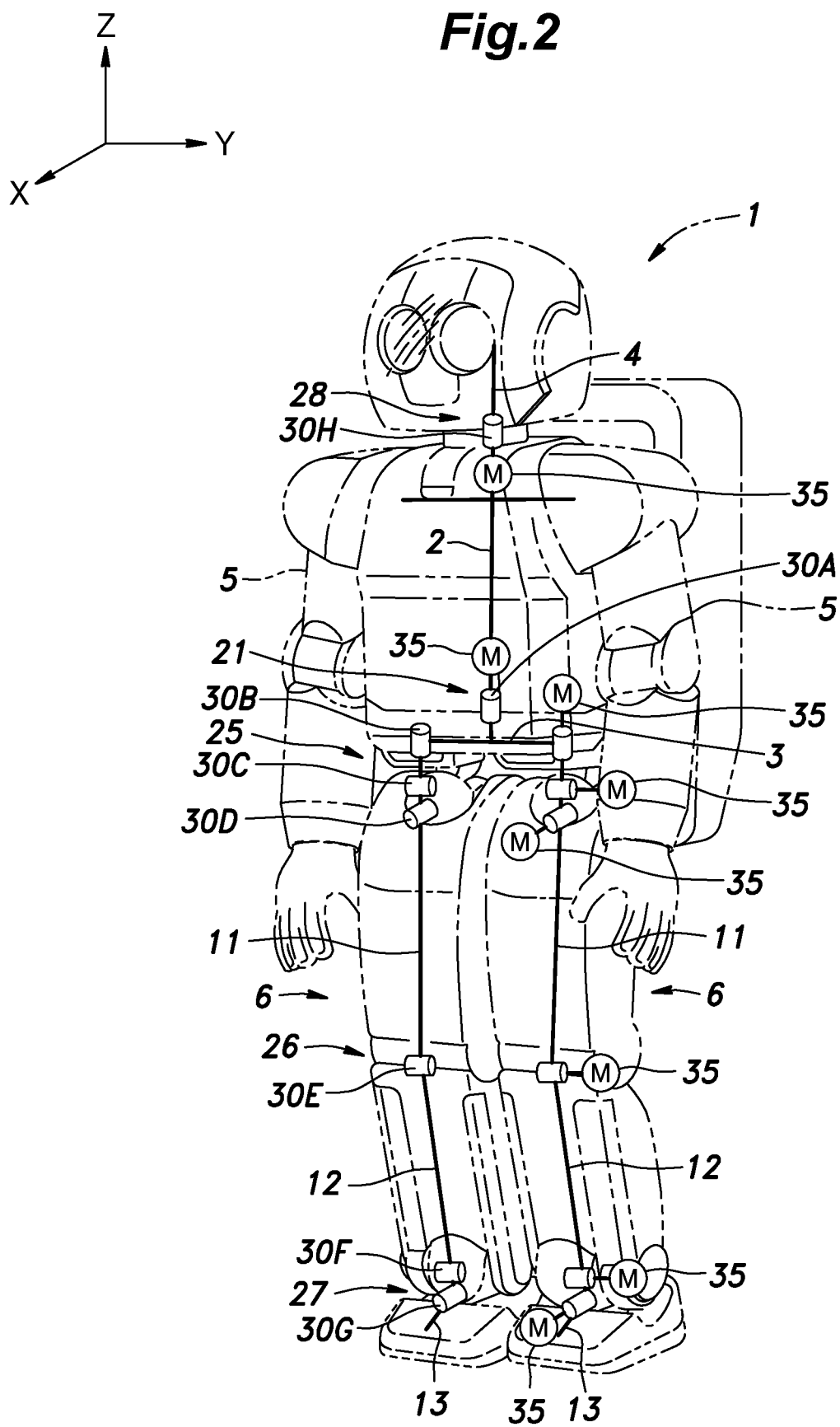
FIG. 2 is an explanatory diagram showing joint structures of the robot shown in FIG. 1.

With reference to FIG. 2, the structure of the waist joint 21, the joints 25-27 of each leg 6, and the neck joint 28 will be described. It is to be noted that the joints 22-24 (see FIG. 1) of each arm 5 are constituted similarly to the joints of the leg 6, and therefore, description thereof will be omitted. In the following description, from the view point of the robot 1, the fore and aft direction is defined as X-axis, the lateral direction as Y-axis, and the vertical direction as Z-axis. The waist joint 21 is constituted of a single waist coupling 30A provided between the torso 2 and the hip 3 which are connected to each other. The waist coupling 30A connects the hip 3 to the torso 2 such that the hip 3 can rotate relative to the torso 2 around the Z-axis. The neck joint 28 is constituted of a single neck coupling 30H provided between the torso 2 and the head 4 which are connected to each other. The neck coupling 30H connects the head 4 to the torso 2 such that the head 4 can rotate relative to the torso 2 around the Z-axis.

The joints 25-27 of each leg 6 are each constituted of at least one coupling 30 (30B-30G), where each coupling 30 is provided between a pair of links connected each other. Each coupling 30 connects the associated pair of links such that the links are rotatable relative to each other around one axis. The rotational movement permitted by each coupling 30 is one of a roll movement around the X-axis, a pitch movement around the Y-axis, and a yaw movement around the Z-axis, and by combining these movements, a rotation with multiple degrees of freedom can be achieved at a joint.

The hip joint 25 is constituted of a first hip coupling 30B, a second hip coupling 30C, and a third hip coupling 30D for allowing the thigh 11 to rotate relative to the hip 3 around the Z-axis, the Y-axis, and the X-axis, respectively. The knee joint 26 is constituted of a knee coupling 30E for allowing the lower leg 12 to rotate relative to the thigh 11 around the Y-axis. The ankle joint 27 is constituted of first and second ankle couplings 30F and 30G for allowing the foot 13 to rotate relative to the lower leg 12 around the Y-axis and the X-axis, respectively.

Each coupling 30 is provided with an electric servomotor 35 (with respect to the legs 6, only the electric servomotors for the left leg are shown in FIG. 2). By drive-controlling the electric servomotors 35, the corresponding couplings 30 are driven to achieve desired motions of the joints.

Figure 3:
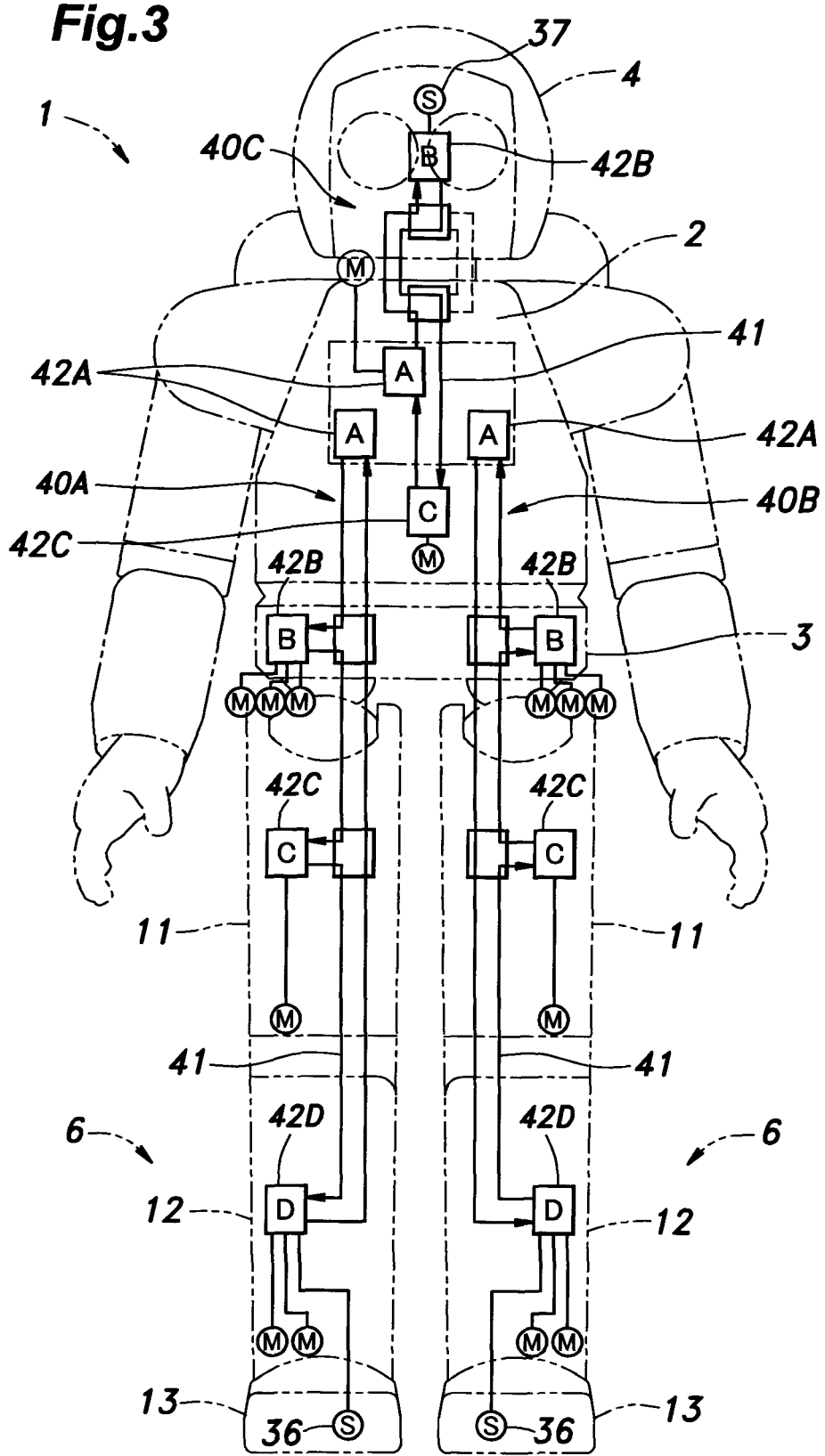
FIG. 3 is a diagram showing an arrangement of a communication system provided in the robot shown in FIG. 1.

As shown in FIG. 3, the robot 1 is provided with a plurality of ring networks 40 (40A-40C) as a communication system for controlling the motions of various parts of the robot 1. Specifically, the robot 1 is provided with a first ring network 40A for controlling the motion of the right leg 6, a second ring network 40B for controlling the motion of the left leg 6, and a third ring network 40C for controlling the motion of the hip 3 and the head 4. Though not shown in the drawings, the robot 1 is further provided with a fourth ring network for controlling the motion of the right arm 5 and a fifth ring network for controlling the motion of the left arm 5.

Each of the first ring network 40A and the second ring network 40B includes a plurality of nodes 42 (nodes 42A to 42D, which may be also referred to as nodes A to D in the drawings) which are distributedly arranged on the torso 2, the hip 3, and the links (11, 12) constituting the corresponding leg 6, and communicably connected to each other by communication lines 41. The third ring network 40C includes a plurality of nodes 42 (nodes 42A to 42C) which are distributedly arranged on the torso 2 and the head 4, and communicably connected to each other by communication lines 41.

The nodes 42 in the first ring network 40A and the second ring network 40B each constitute a control device configured to servo-control the one or more electric servomotors 35 associated thereto. The nodes 42 in the first ring network 40A cooperate with each other to control the motion of the right leg 6, while the nodes 42 in the second ring network 40B cooperate with each other to control the motion of the left leg 6. At least one (in the illustrated embodiment, the node 42A and the node 42B) of the nodes 42 of each of the first and second ring networks 40A, 40B is provided on the main body (torso 2 and hip 3) of the robot 1, while the remaining nodes 42 (in the illustrated embodiment, the node 42C and the node 42D) are provided on the links (in the illustrated embodiment, the thigh 11 and the lower leg 12) of the corresponding leg 6. Though not shown in the drawings, the fourth and fifth ring networks provided for the left and right arms 5, respectively, are configured in a similar manner. Two (node 42A and node 42C) of the three nodes 42 in the third ring network 40C each constitute a control device configured to servo-control the associated electric servomotor 35, and cooperate with each other to control the motion of the hip 3 and the head 4 relative to the torso 2. Thus, the ring networks 40 constitute a distributed control system in which the nodes 42 for controlling the various parts of the robot 1 are distributedly arranged.

Of the nodes 42 of the ring networks 40, the nodes 42A (nodes A), which are provided one for each of the first to third ring networks 40A to 40C and located on the torso 2, are communicably connected to each other to constitute a main controller. The network topology of these nodes 42A may be of any type. Each node 42A acts as an upper node 42, or a host node, that generates operation commands or the like for the other nodes 42 in the own ring network 40 (namely, the ring network 40 that includes the node 42A). The remaining three or two nodes 42 (42B, 42C, 42D) in each ring network 40 act as agent nodes that control the motion of the relevant joints following the operation commands generated by the node 42A.

The communication lines 41 in each of the first ring network 40A and the second ring network 40B are routed in the robot 1 from the torso 2 to the lower leg 12 to pass the three joints (21, 25, 26). The communication lines 41 in the third ring network 40C are routed in the robot 1 from the torso 2 to the head 4 to pass the neck joint 28. In each of the ring networks 40, the signal transfer direction is predetermined. In the first ring network 40A, connection is made such that the signal is transferred from the node 42A, which is provided on the torso 2 and acts as the host node, to the node 42B provided on the hip 3 to the node 42C provided on the thigh 11 to the node 42D provided on the lower leg 12 and back to the node 42A in this order, where the nodes 42B to 42D act as the agent nodes. In the second ring network 40B, connection is made such that the signal is transferred from the node 42A, which is provided on the torso 2 and acts as the host node, to the node 42D provided on the lower leg 12 to the node 42C provided on the thigh 11 to the node 42B provided on the hip 3 and back to the node 42A in this order. In the third ring network 40C, connection is made such that the signal is transferred from the node 42A, which is provided on the torso 2 and acts as the host node, to the node 42B provided on the head 4 to the node 42C provided on the torso 2 and back to the node 42A in this order. In the present embodiment, optical fiber cables are used as the communication lines 41. In another embodiment, electric signal lines may be used as the communication lines 41.

In the present embodiment, in each of the first ring network 40A and the second ring network 40B, the node 42D is configured to control the operation of the electric servomotors 35 for driving the first and second ankle couplings 30F and 30G, and to receive a detection signal of a ground contact sensor 36 provided on the foot 13, the node 42C is configured to control the operation of the electric servomotor 35 for driving the knee coupling 30E, and the node 42B is configured to control the operation of the electric servomotors 35 for driving the first to third hip couplings 30B to 30D. In the third ring network 40C, the node 42C is configured to control the electric servomotor 35 for driving the waist coupling 30A, the node 42A is configured to control the electric servomotor 35 for driving the neck coupling 30H, and the node 42B is configured to receive a detection signal of an image sensor 37 provided on the head 4.

Each node 42 includes a CPU serving as an arithmetic processing unit, a network controller 45 (FIG. 5) configured to send data D in one direction along the ring network 40, and a memory storing software. Since optical fiber cables are used as the communication lines 41 in the present embodiment, the network controller 45 includes optical transceiver modules transmitting and receiving optical signals. Thus, the communication lines 41 are constituted of a plurality of optical fiber cables each extending between the optical transceiver modules provided on a corresponding pair of adjoining nodes 42 such that the optical fiber cables connect the nodes to transmit signals (data) in one direction in the aforementioned order. It is to be noted that the ring network 40 may not necessarily have a physical ring topology but may have a logical ring topology.

Each node 42 is a control device that executes, with the CPU, arithmetic processing using software, and, based on the data output by the arithmetic processing, controls an associated control target 47 (FIG. 5) which consists of hardware. "Hardware" in this embodiment is an electric device electrically connected with a power supply, and may be, for example, an electric servomotor, a solenoid valve, a lighting apparatus, an electric element, or a driver for controlling the supply of power thereto.

The data D transmitted on the ring networks 40 include two types of data; ordinary data used in ordinary control (namely, used for control of the hardware conducted by a later-described controller 49) and interrupt data that is generated when it is desired to control the hardware without via the controller 49 and is prioritized than the ordinary data. Detailed explanation of the two types of the data D is omitted here, but if necessary, reference should be made to JP2017-175231A (US2017/0272272A1) filed by the Applicant. In the present embodiment, the data D is transferred in the form of a packet P having a configuration shown in FIG. 4.

Figure 4:
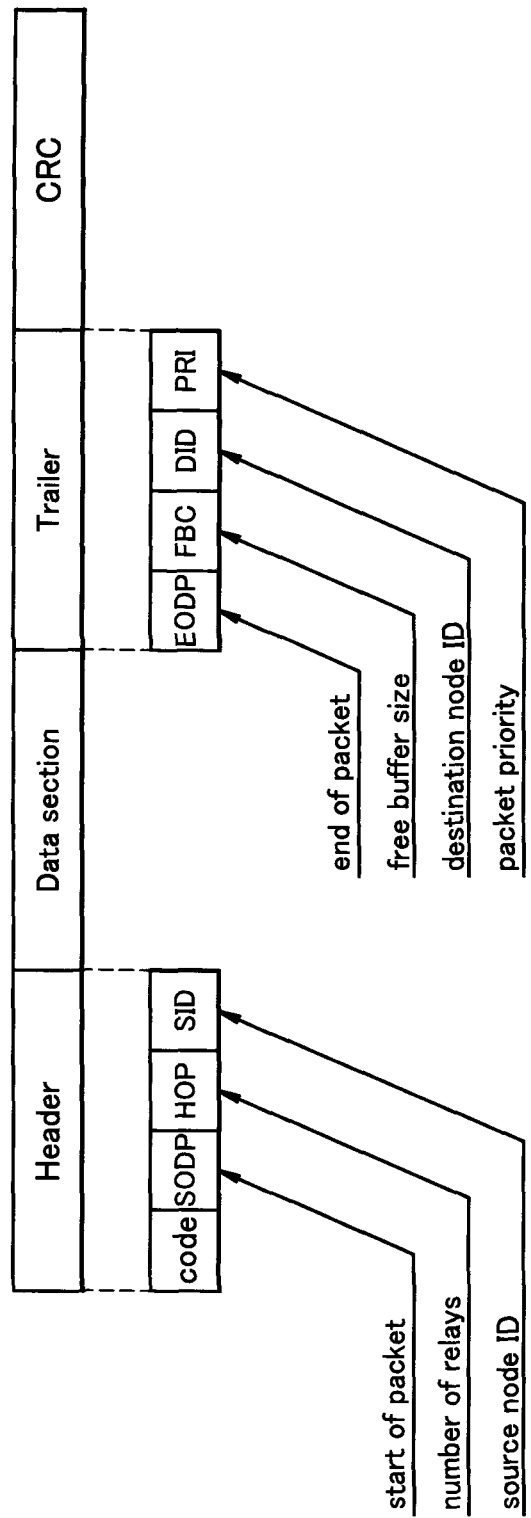
FIG. 4 is a configuration diagram of a packet.

As shown in FIG. 4, the packet P containing the data D is constituted of a frame including, from the top, a header, data section (data D), trailer, and CRC (cyclic redundancy check). The header is constituted of a code, start of packet (SOP), number of relays (hop count) (HOP), and source node ID (SID). The trailer is constituted of an end of packet (EOP), free buffer size (FBC), destination node ID (DID), and packet priority (PRI). There may be no limit to the size (bytes) of the data section such that all data D necessary for a series of instructions may be included in a single data section. Alternatively, the size of the data section in each frame may be limited to a predetermined size such that, if the size of all data D necessary for a series of instructions is larger than the predetermined size, the data section of one frame contains only one of the data pieces resulting from dividing of the data D.

The number of relays (HOP) indicates the number of the nodes 42 that relayed the packet P. The number of relays (HOP) is set to 0 (zero) by the node 42 that creates the packet P, and is incremented by one unit (in the present embodiment, 1 (one)) each time the packet is relayed by a node 42. More concrete explanation will be provided below.

Figure 5:
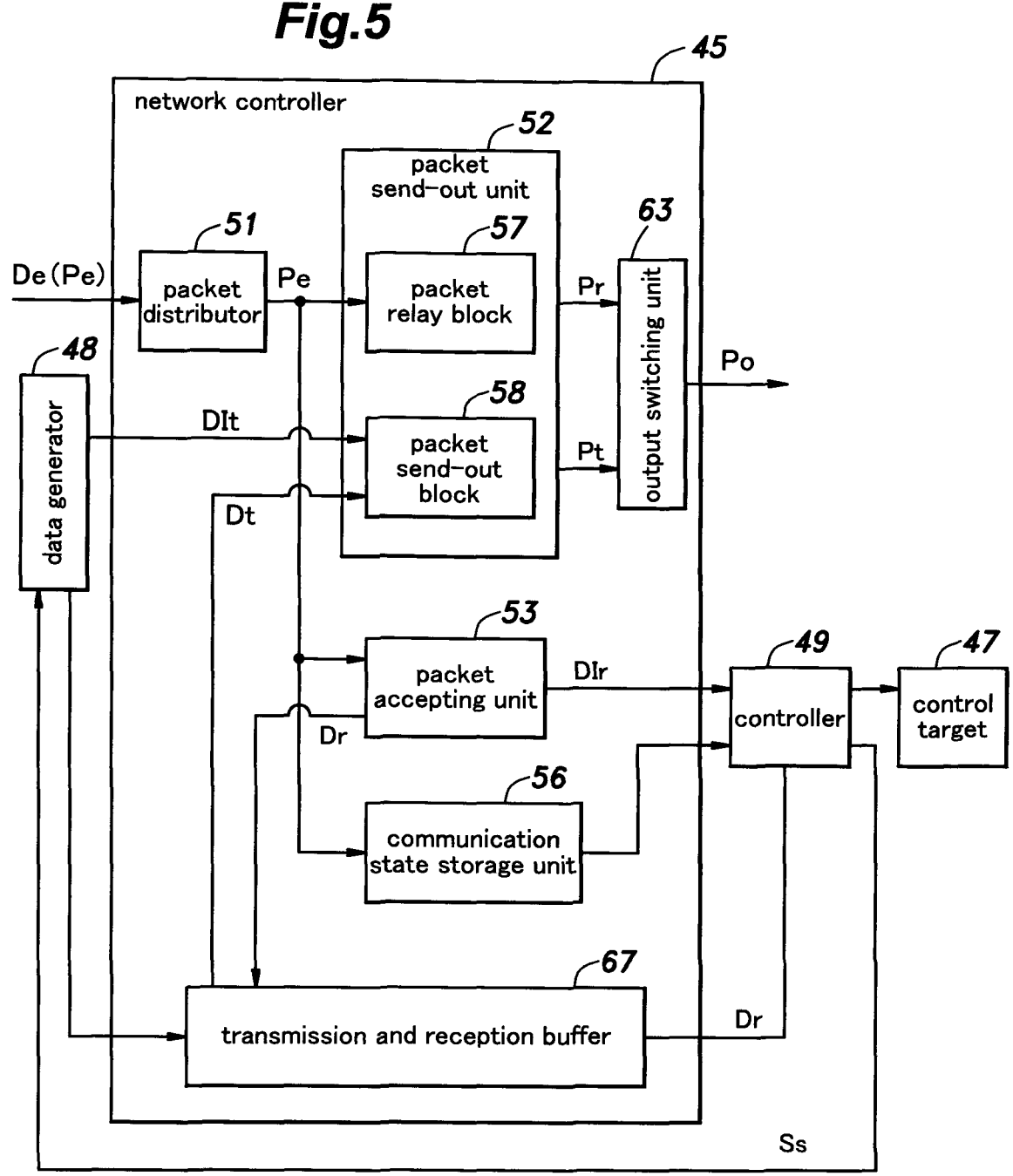
FIG. 5 is a functional block diagram of each node shown in FIG. 3.

FIG. 5 is a functional block diagram of each node 42. As shown in FIG. 5, each node 42 includes: the aforementioned network controller 45 implemented by hardware; a software-operated data generator 48 which is a functional unit that executes, with the CPU, arithmetic processing using software to generate data D to be transmitted to another node 42 (hereinafter referred to as transmission data Dt) and data-related information such as a code and a priority to be added to the data D (hereinafter referred to as data information DI); and a software-operated controller 49 which is a functional unit that executes, with the CPU, arithmetic processing using software based on at least the data D contained in the packet P transmitted from another node 42 and controls the control target 47.

The data generator 48 generates the transmission data Dt to be transmitted to other nodes 42. The data generator 48 is configured to generate the transmission data Dt according to a predetermined repeating pattern (e.g., at a predetermined time interval). In the present description, the transmission data Dt means the data D that is generated by the data generator 48 of each node 42 but is yet to be transmitted, and the term is used to distinguish it from the data D input to the node 42 via the communication lines 41. The data generator 48 also generates the data information DI to be included in the header and trailer of the packet P containing the transmission data Dt. In the following description, the packet P containing the transmission data Dt and having the header and trailer will be referred to as a transmission packet Pt.

In each node 42, the packet P containing the data D transmitted from an upstream side in the ring network 40 is input to the network controller 45. In the present description, the data D and the packet P input to each node 42 are referred to as input data De and an input packet Pe, respectively, to distinguish them from the transmission data Dt and transmission packet Pt generated by the data generator 48 of the node 42 and yet to be transmitted.

The network controller 45 includes a packet distributor 51 that distributes the input packet Pe containing the input data De to later-described various units (blocks) of the own node 42. In principle, the packet distributor 51 recognizes a data segment from the header to the trailer (or to the CRC when the CRC is added after the trailer) as a single input packet Pe. Description of the exceptions is omitted here. Upon input of the packet P (Pe), the packet distributor 51 distributes the input packet Pe to each of a packet send-out unit 52, a packet accepting unit 53, and a communication state storage unit 56.

The data generator 48 writes the generated transmission data Dt addressed to another node 42 in a transmission and reception buffer 67, and writes the data information DI of the transmission data Dt (hereinafter referred to as transmission data information DIt) in the packet send-out unit 52.

The packet send-out unit 52 includes a packet relay block 57 and a packet send-out block 58. The packet relay block 57 is configured to, when the destination of the input packet Pe distributed from the packet distributor 51 is not the own node, send out the input packet Pe as it is as a relay packet Pr to be relayed after adding one unit (1) to the number of relays (HOP). The packet send-out block 58 is configured to send out the transmission data Dt generated by the data generator 48 to be addressed to another node 42, after converting it to the transmission packet Pt. The packet send-out block 58 reads out, from the transmission and reception buffer 67, the transmission data Dt corresponding to the transmission data information DIt written by the data generator 48, and adds a header, trailer, and CRC to the transmission data Dt to generate the transmission packet Pt. Further, the packet send-out block 58 performs transmission completion determination based on the input packet Pe distributed from the packet distributor 51. Specifically, when the input packet Pe is identical with the transmission packet Pt previously transmitted from the own node, namely when it is determined that the transmission packet Pt previously generated by the own node has returned after circulating the ring network 40 one round, the packet send-out block 58 determines that the transmission of the transmission packet Pt is completed.

The packet accepting unit 53 is configured such that, when the destination of the input packet Pe distributed from the packet distributor 51 is the own node and hence the input packet Pe should be accepted, the packet accepting unit 53 accepts the input packet Pe and writes the input data De contained therein in the transmission and reception buffer 67 as reception data Dr while forwarding the transmission data information DIt contained in the input packet Pe to the controller 49. The controller 49 reads out, from the transmission and reception buffer 67, the reception data Dr corresponding to the transmission data information DIt forwarded from the packet accepting unit 53, and, based on the read-out reception data Dr, controls the control target 47 (hardware).

An output switching unit 63 is configured to output one of the relay packet Pr and the transmission packet Pt that has an earlier input timing as the packet P to be sent out to another node 42. Specifically, when one of the relay packet Pr and the transmission packet Pt is input, the output switching unit 63 outputs the input packet as the packet P to be sent out, and when the relay packet Pr and the transmission packet Pt are input simultaneously, the output switching unit 63 switches the output packet P between the relay packet Pr and the transmission packet Pt such that the transmission packet Pt is output with priority (earlier).

Detailed description of the above units and blocks is omitted here. If necessary, reference should be made to JP2017-11519A (US2016/0380835A1) and JP2017-175231A (US2017/0272272A1) filed by the Applicant.

The communication state storage unit 56 is configured to store the transmission data information DIt for determining, for each input packet Pe distributed by the packet distributor 51, whether the transmission according to the aforementioned repeating pattern has been performed and whether the relationship between the number of relays (HOP) and the source node ID (SID) is proper.

Figure 6:
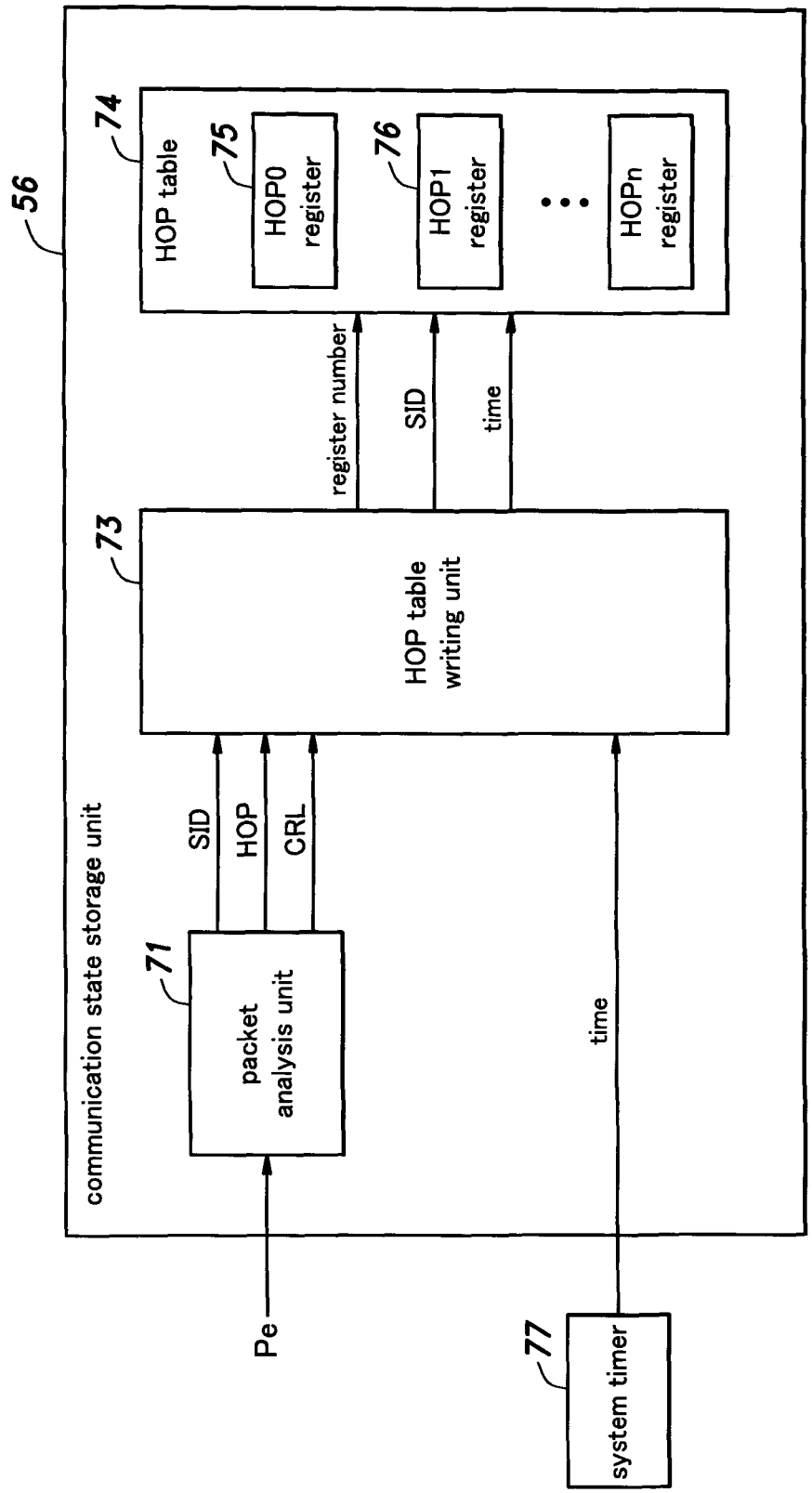
FIG. 6 is a functional block diagram of a communication state storage unit shown in FIG. 5.

As shown in FIG. 6, the communication state storage unit 56 includes a packet analysis unit 71 configured to analyze the source node ID (SID), the number of relays (HOP), and the CRC of the input packet Pe. The communication state storage unit 56 further includes a HOP table writing unit 73 configured to write the source node ID (SID), the number of relays (HOP), and the CRC of the input packet Pe analyzed by the packet analysis unit 71 in a HOP table 74 together with a register number and a time provided by a system timer 77. The HOP table 74 is provided with a $HOP^0$ register 75 which is an input field regarding the input packet Pe whose HOP is equal to 0, a $HOP^1$ register 76 which is an input field regarding the input packet Pe whose HOP is equal to 1, . . . and a HOPn register which is an input field regarding the input packet Pe whose HOP is equal to n, and the source node ID (SID) and the CRC are written in these registers (75, 76, . . . ) for each HOP.

The controller 49 (FIG. 5) is configured to function as a communication error detector that reads out the HOP table 74 and determines whether the transmission according to the aforementioned repeating pattern has been performed to thereby detect an occurrence of a communication error in the ring network 40. Here, the communication error may include, in addition to a break of any optical fiber cable constituting the communication lines 41, a transmission/reception failure of the packet P due to malfunction of any node 42, excessively large number of transmissions and receptions of the packet P due to any node 42 running out of control, etc. Further, the controller 49 refers to the HOP table 74 and identifies the part where the communication error has occurred based on the relationship between the source node ID (SID) and the number of relays (HOP).

It is to be noted that not all of the nodes 42 necessarily have to have all the functional units shown in FIG. 5. For instance, arrangement may be made such that the node 42A acting as the host node in some ring network 40 has the communication state storage unit 56, but the other nodes 42 in the same ring network 40 do not have the communication state storage unit 56.

Next, with reference to FIG. 7, description will be made of the first ring network 40A and the second ring network 40B in the communication system provided in the robot 1.

Figure 7:
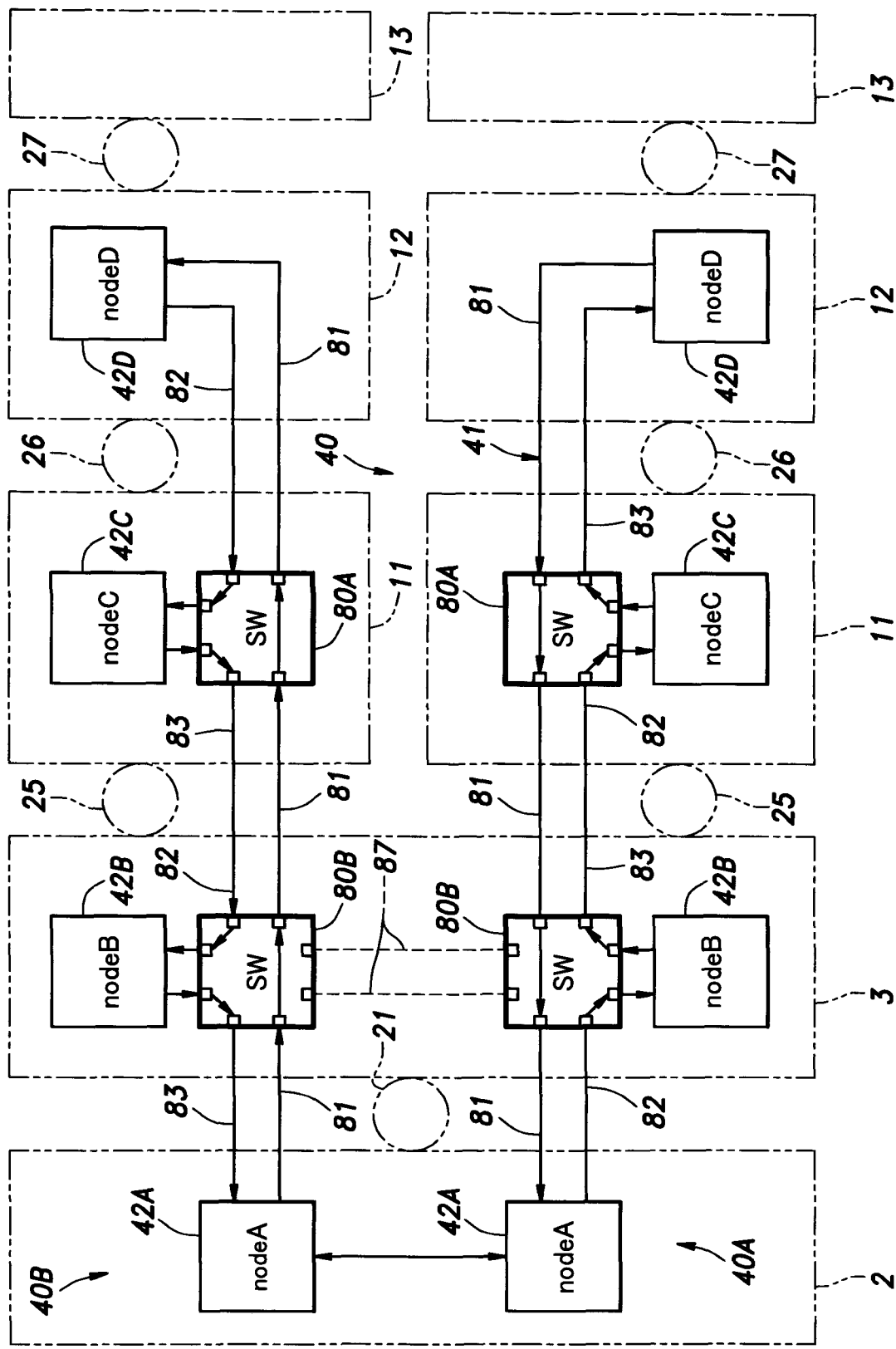
FIG. 7 is a schematic configuration diagram of first and second ring networks shown in FIG. 3.

As shown in FIG. 7, each of the two ring networks 40 (40A, 40B) is provided with two switches 80 (a first switch 80A and a second switch 80B) (represented as "SW" in the drawings) that are provided on the communication lines 41 connecting the four nodes 42 in each ring network 40. In the following, explanation will be made concretely taking the first ring network 40A as an example.

The node 42A acting as the host node and the node 42D located at the furthest position from the node 42A in the downstream direction are connected with each other by a first communication line 81. The node 42B and the node 42C, which are provided downstream of the node 42A and between the node 42A and the node 42D and thus may be referred to as intermediate nodes 42M, are each connected to the immediately upstream node 42 (42A, 42B) by an input-side communication line 82 and to the immediately downstream node 42 (42C, 42D) by an output-side communication line 83. Thus, the output-side communication line 83 for the node 42B and the input-side communication line 82 for the node 42C refer to the same signal communication line. The first communication line 81 is provided to pass near the input-side communication lines 82 and the output-side communication lines 83 for the node 42B and the node 42C.

The first switch 80A is provided on the input-side communication line 82 and the output-side communication line 83 for the node 42C and a part of the first communication line 81 passing the node 42C. The second switch 80B is provided on the input-side communication line 82 and the output-side communication line 83 for the node 42B and a part of the first communication line 81 passing the node 42B. Namely, the switches 80 are provided one for each intermediate node 42M (42B, 42C). It is to be noted that the signal transfer direction in the first ring network 40A may be reversed from that shown in FIG. 7. That is, the node 42D may be located at the closest position from the node A in the downstream direction as in the second ring network 40B. In this case also, the node 42B and the node 42C serve as the intermediate nodes 42M, and the switches 80 are provided one for each intermediate node 42M (42B, 42C).

Figure 8:
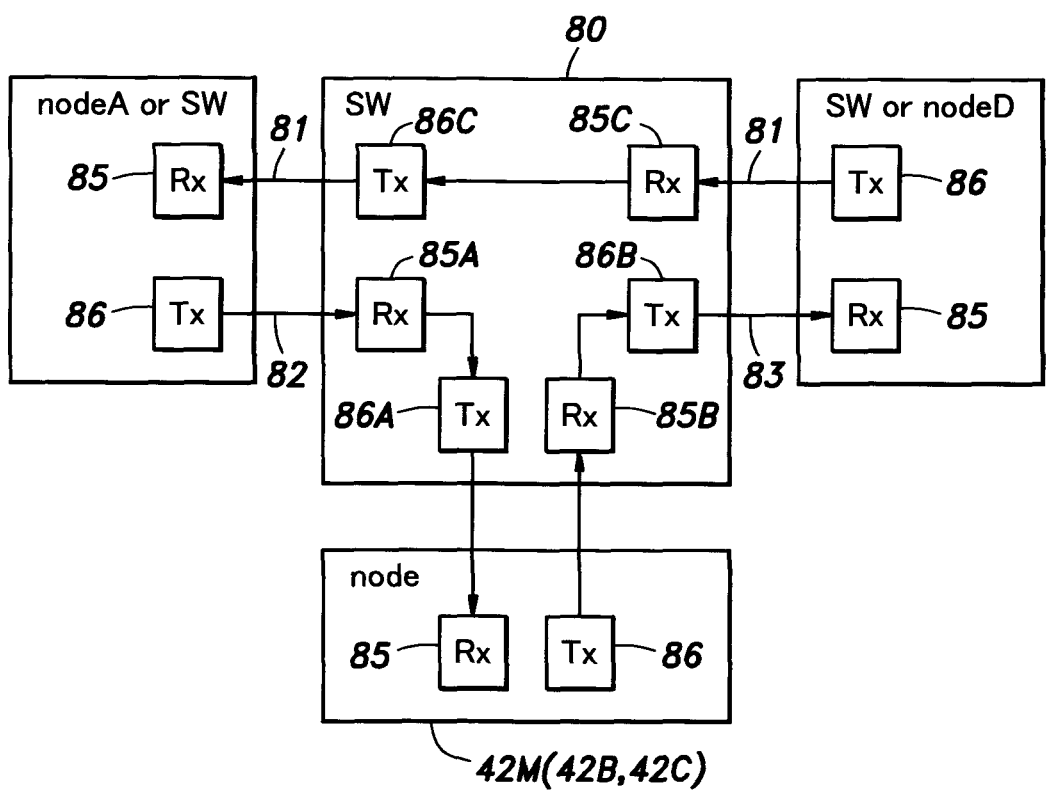
FIG. 8 is a schematic configuration diagram showing a structure common to first and second switches shown in FIG. 7.

FIG. 8 is a schematic configuration diagram showing the structure common to the first switch 80A and the second switch 80B. The second switch 80B includes the same configuration as the first switch 80A though the second switch 80B further includes an additional configuration as described later, and thus, in the following description with reference to FIGS. 8 to 12, the first and second switches 80A and 80B will be summarily referred to as the switches 80.

As shown in FIG. 8, each switch 80 is provided with three reception ports 85 (first to third reception ports 85A to 85C) (represented as "Rx" in the drawings) and three transmission ports 86 (first to third transmission ports 86A to 86C) (represented as "Tx" in the drawings). The first reception port 85A is connected with an upstream section of the input-side communication line 82 that is connected to the transmission port 86 (Tx) of the node 42A or the switch 80 located on the upstream side. The first reception port 85A and the first transmission port 86A are connected to each other inside the switch 80. The first transmission port 86A is connected to the reception port 85 (Rx) of the associated intermediate node 42M (node 42B or node 42C) by a downstream section of the input-side communication line 82. The second reception port 85B is connected to the transmission port 86 of the associated intermediate node 42M by an upstream section of the output-side communication line 83. The second reception port 85B and the second transmission port 86B are connected to each other inside the switch 80. The second transmission port 86B is connected with a downstream section of the output-side communication line 83 which in turn is connected to the reception port 85 of the switch 80 or the node 42D on the downstream side. The third reception port 85C is connected with a section of the first communication line 81 that is connected to the transmission port 86 of the switch 80 or the node 42D on the downstream side. The third reception port 85C and the third transmission port 86C are connected to each other inside the switch 80. The third transmission port 86C is connected with a section of the first communication line 81 which in turn is connected to the reception port 85 of the node 42A or the switches 80 on the upstream side. Thus, the third reception port 85C and the third transmission port 86C are provided on the first communication line 81 in this order from the upstream side. In the present embodiment, the reception ports 85A to 85C and the transmission ports 86A to 86C serve as regular ports which are switchably connected to one another in the switch 80 and are each connected with one of the communication lines 41.

Each switch 80 is configured to be capable of switching a signal (packet) transfer path therein, or to be capable of switching (or changing) the internal connection between the reception and transmission ports. Specifically, each switch 80 is configured to switch the signal transfer path based on a transfer state, in the input-side communication line 82 and the output-side communication line 83, of the relay packet Pr (ordinary relay packet Prn or interrupt relay packet Pri) to be relayed by the associated intermediate node 42M (node 42B or node 42C) and a transfer state, in the output-side communication line 83 and the input-side communication line 82, of the transmission packet Pt (ordinary transmission packet Ptn or interrupt transmission packet Pti) output from the associated intermediate node 42M. The switching performed by each switch 80 will be explained concretely below.

FIGS. 9A to 9C are explanatory diagrams showing three switching states that can be taken by each switch 80 in the first ring network 40A. As shown in FIG. 9A, in the first switching state, the switch 80 makes a short circuit between the upstream section of the input-side communication line 82 for the associated intermediate node 42M and the output-side communication line 83 for the same (by internally connecting the first reception port 85A to the second transmission port 86B) while maintaining the connection of the output-side communication line 83. As shown in FIG. 9B, in the second switching state, the switch 80 disconnects the output-side communication line 83 for the associated intermediate node 42M (by cutting the connection between the second reception port 85B and the second transmission port 86B) and makes a short circuit between the upstream section of the input-side communication line 82 and the output-side communication line 83. As shown in FIG. 9C, in the third switching state, the switch 80 makes a short-circuit between the upstream section of the output-side communication line 83 for the associated intermediate node 42M and the first communication line 81 (by internally connecting the second reception port 85B to the third transmission port 86C) while maintaining the connection of the first communication line 81. The switch 80 is configured to selectively take one of the three switching states based on the packet transfer state.

Figure 10:
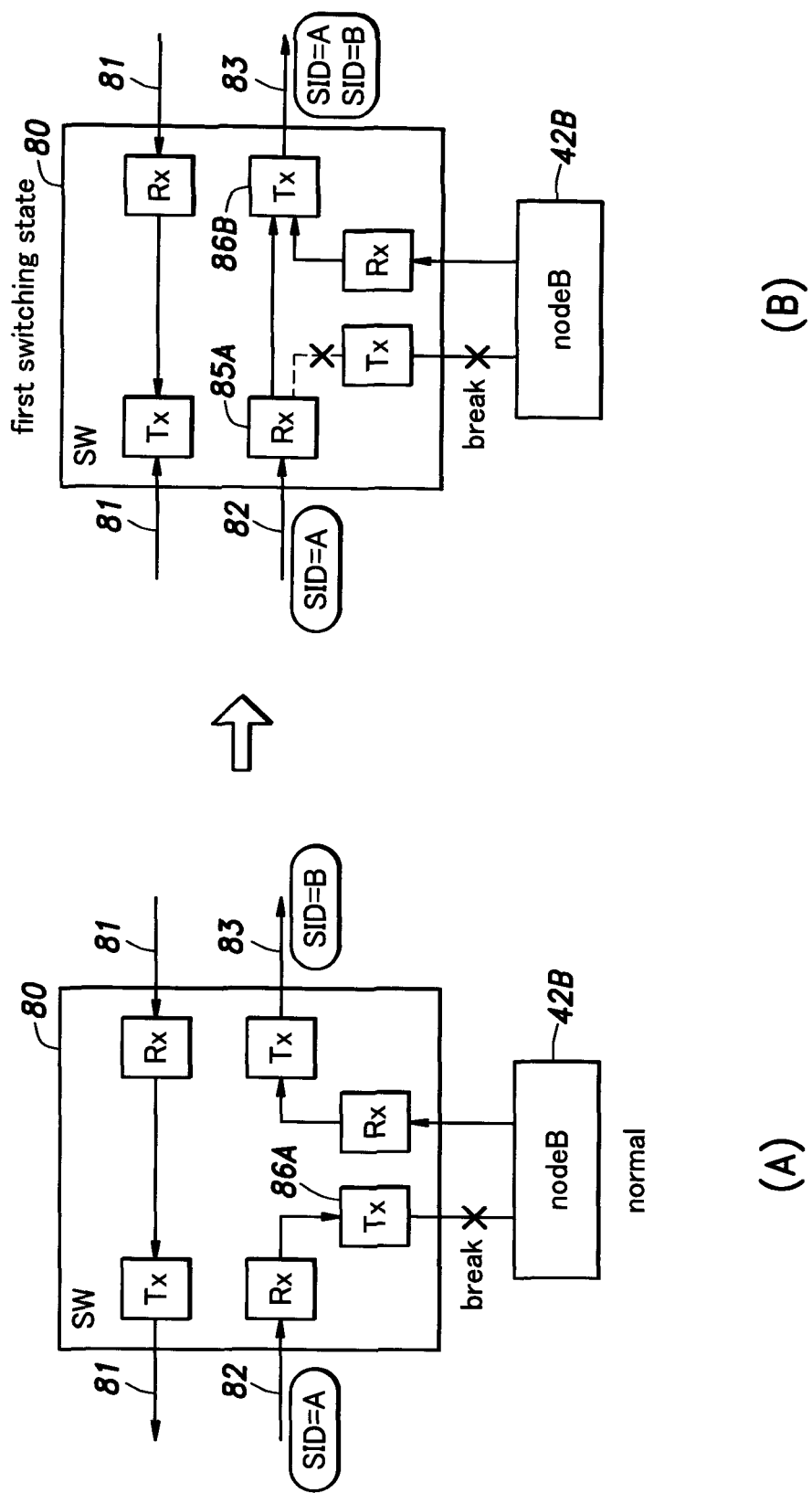
FIG. 10 is an explanatory diagram for explaining a switching condition for switching to the first switching state shown in FIG. 9A.

FIG. 10 is an explanatory diagram for explaining a switching condition for switching to the first switching state, taking the node 42B as an example of the intermediate nodes 42M. As shown in part (A) of FIG. 10, in a case where the relay packet Pr (e.g., the relay packet Pr having the source node ID (SID) equal to A) transmitted by an upstream-side node 42 according to the predetermined repeating pattern and having passed through the input-side communication line 82 is not transferred to the output-side communication line 83 and where the transmission packet Pt output from the node 42B according to the predetermined repeating pattern and having the SID equal to B is transferred to the output-side communication line 83, the switch 80 determines (or assumes) that the node 42B is normal and that there is a failure in the connection between the first transmission port 86A and the node 42B, and switches to the first switching state shown in part (B) of FIG. 10. Once the switch 80 has switched to the first switching state, the relay packet Pr received by the first reception port 85A is transmitted to the output-side communication line 83 via the second transmission port 86B without passing through the node 42B. Thereby, both the relay packet Pr and the transmission packet Pt having the SID equal to B are transferred to the output-side communication line 83.

Figure 11:
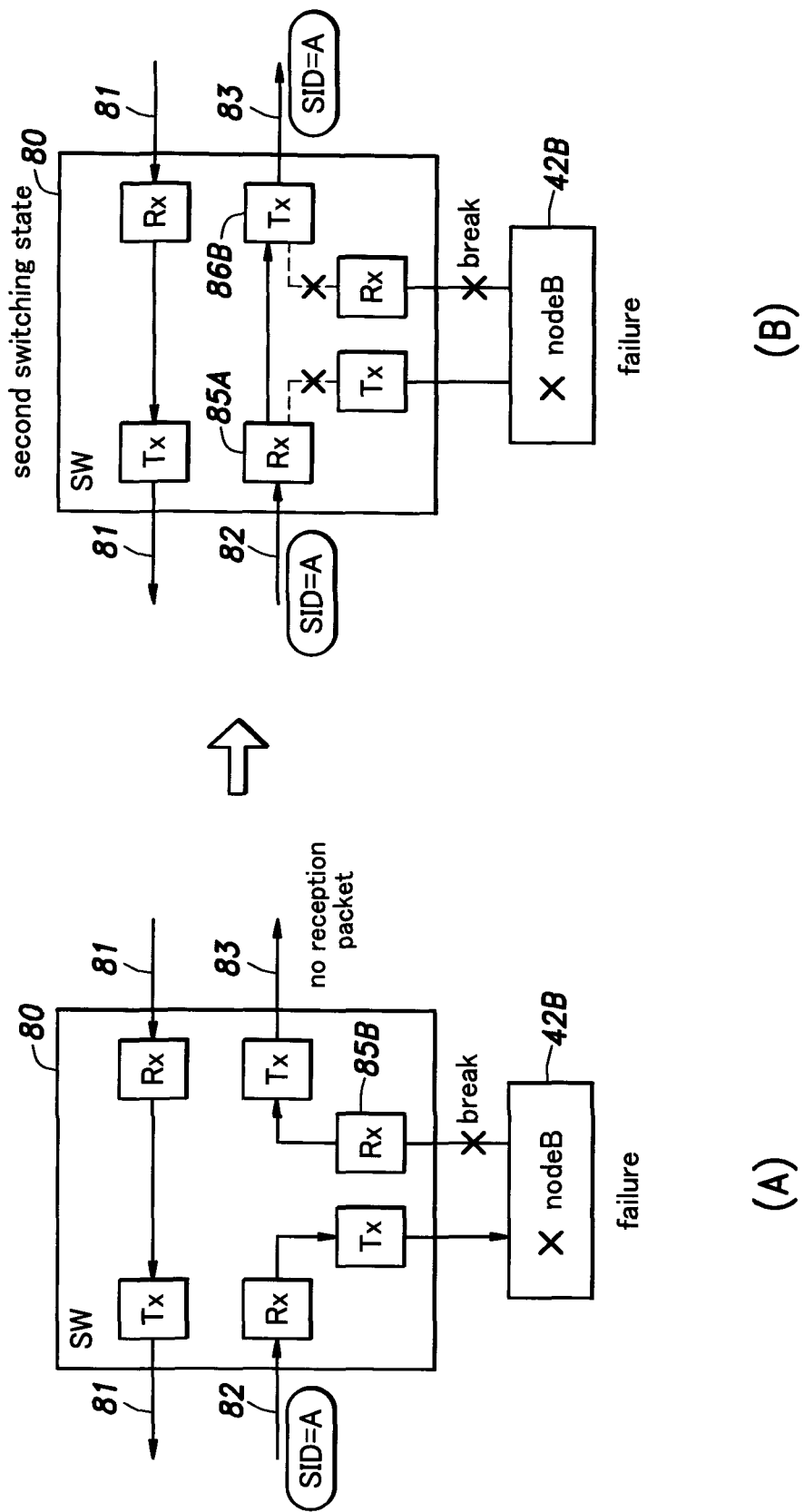
FIG. 11 is an explanatory diagram for explaining a switching condition for switching to the second switching state shown in FIG. 9B.

FIG. 11 is an explanatory diagram for explaining a switching condition for switching to the second switching state, taking the node 42B as an example of the intermediate nodes 42M. As shown in part (A) of FIG. 11, in a case where the relay packet Pr (e.g., the relay packet Pr having the SID equal to A) transmitted by an upstream-side node 42 according to the predetermined repeating pattern and having passed through the input-side communication line 82 is not transferred to the output-side communication line 83 and where the transmission packet Pt output from the node 42B according to the predetermined repeating pattern and having the SID equal to B is not transferred to the output-side communication line 83, the switch 80 determines (or assumes) that the node 42B is in failure or there is a failure in the connection between the node 42B and the second reception port 85B, and switches to the second switching state shown in part (B) of FIG. 11. Once the switch 80 has switched to the second switching state, the relay packet Pr received by the first reception port 85A is transmitted to the output-side communication line 83 via the second transmission port 86B without passing through the node 42B. Thereby, only the relay packet Pr is transferred to the output-side communication line 83.

Figure 12:
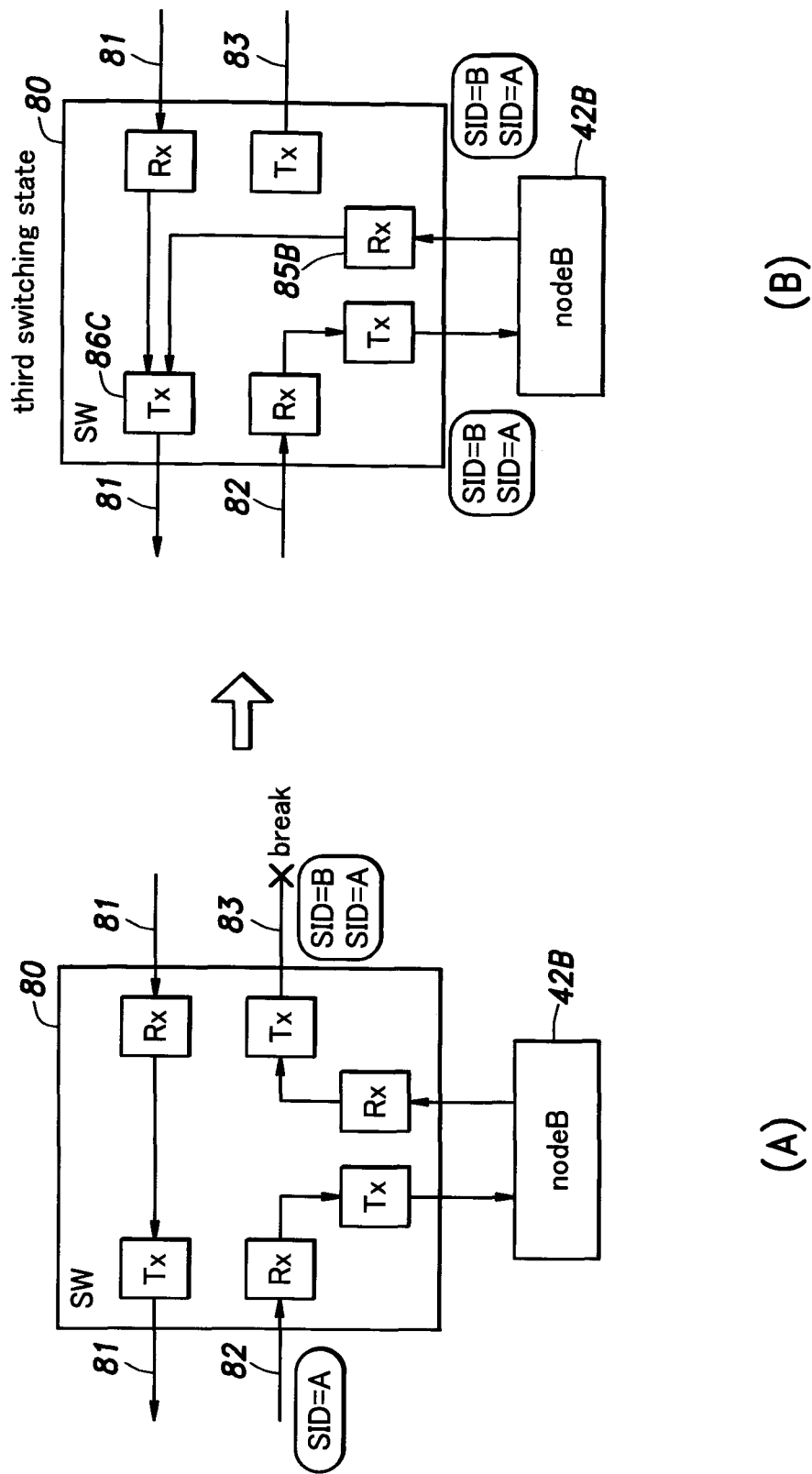
FIG. 12 is an explanatory diagram for explaining a switching condition for switching to the third switching state shown in FIG. 9C.

FIG. 12 is an explanatory diagram for explaining a switching condition for switching to the third switching state, taking the node 42B as an example of the intermediate nodes 42M. As shown in part (A) of FIG. 12, in a case where the relay packet Pr (e.g., the relay packet Pr having the SID equal to A) transmitted by an upstream-side node 42 according to the predetermined repeating pattern and having passed through the input-side communication line 82 is transferred to the output-side communication line 83 and where the transmission packet Pt output from the node 42B according to the predetermined repeating pattern and having the SID equal to B is transferred to the output-side communication line 83 but is not transferred (or not returned after circulating through the ring network) to the input-side communication line 82, the switch 80 determines (or assumes) that there is a communication error in the output-side communication line 83, and switches to the third switching state shown in part (B) of FIG. 12. Once the switch 80 has switched to the third switching state, the relay packet Pr and the transmission packet Pt having the SID equal to B received by the second reception port 85B are transferred to the first communication line 81 via the third transmission port 86C without passing through the downstream-side nodes 42. Thereby, the transmission packet Pt having the SID equal to B is allowed to be transferred (returned) to the input-side communication line 82.

As each switch 80 is configured to switch the signal (packet) transfer path as described above, the controller 49 (FIG. 5) of each node 42 in the first ring network 40A, which serves as a communication error detector, is allowed to determine a part where a communication error occurs based on a change in the relationship between the number of relays (HOP) and the source node ID (SID).

Figure 13A:
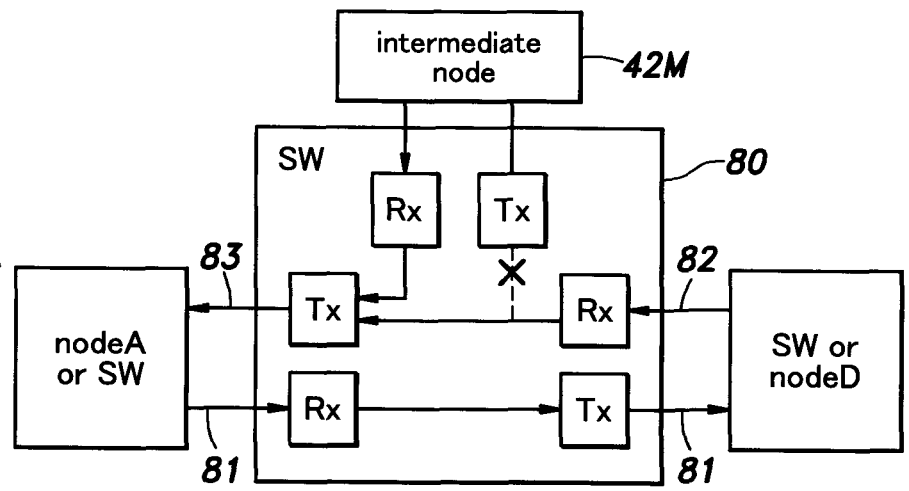
FIGS. 13A, 13B, and 13C are explanatory diagrams respectively showing first, second, and fourth switching states that can be taken by the each switch in the second ring network shown in FIG. 8.
Figure 13B:
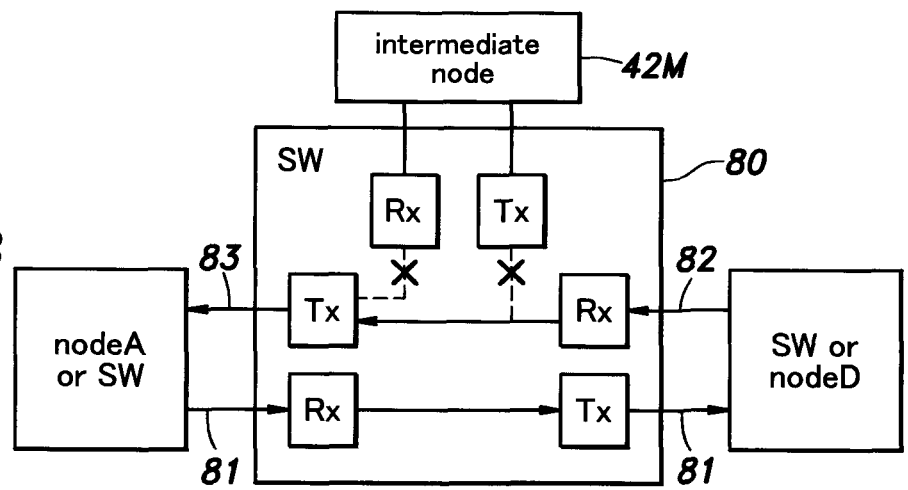
Figure 13C:
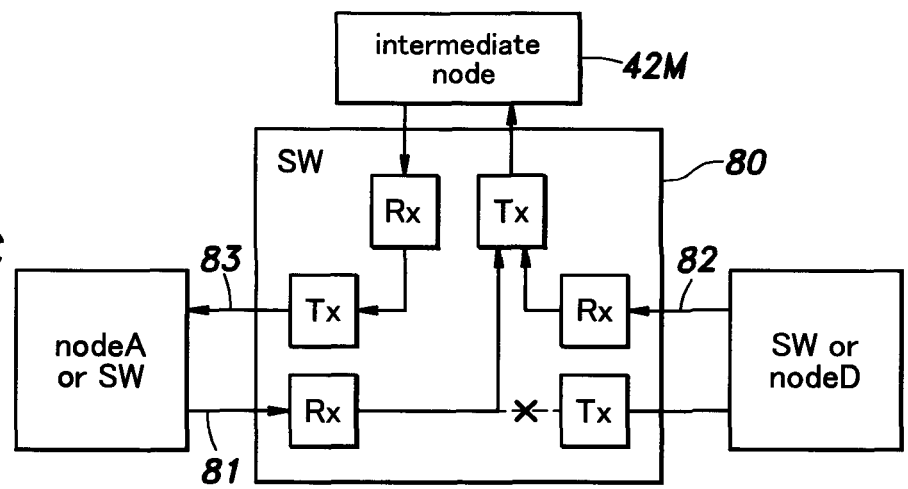

FIGS. 13A to 13C are explanatory diagrams showing three switching states that can be taken by each switch 80 in the second ring network 40B. As shown in FIG. 13A, in the first switching state, in a similar manner as in FIG. 9A, the switch 80 connects the upstream section of the input-side communication line 82 for the associated intermediate node 42M to the output-side communication line 83 while maintaining the connection of the output-side communication line 83 for the associated intermediate node 42M. As shown in FIG. 13B, in the second switching state, in a similar manner as in FIG. 9B, the switches 80 disconnects the output-side communication line 83 for the associated intermediate node 42M and connects the upstream section of the input-side communication line 82 to the output-side communication line 83. On the other hand, as shown in FIG. 13C, the switch 80 in the second ring network 40B is configured to take a fourth switching state which is different from the third switching state shown in FIG. 9C. In the fourth switching state, the switch 80 makes a short-circuit between a section of the first communication line 81 for connection with the upstream node or switch and the input-side communication line 82 for the associated node 42M (by internally connecting the third reception port 85C to the first transmission port 86A) while maintaining the connection of the input-side communication line 82. The switch 80 is configured to selectively take one of the three switching states based on the packet transfer state.

The switching conditions for switching to the first and second switching states shown in FIGS. 13A and 13B are the same as those described above with reference to FIGS. 10 and 11 regarding the first and second switching states shown in FIGS. 9A and 9B, and therefore, description thereof is not repeated. In the following, a switching condition for switching to the fourth switching state shown in FIG. 13C is described with reference to FIG. 14.

Figure 14:
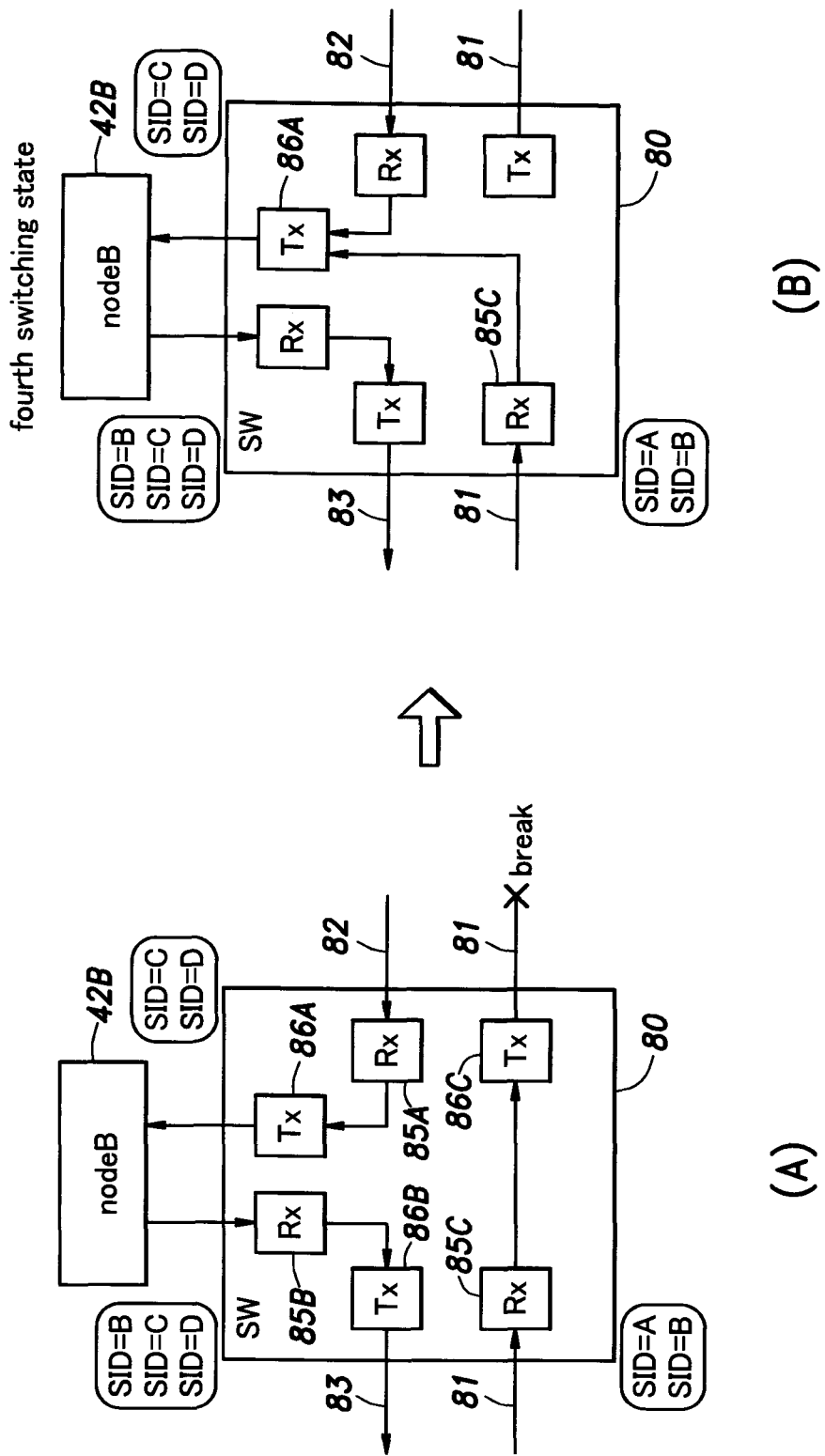
FIG. 14 is an explanatory diagram for explaining a switching condition for switching to the fourth switching state shown in FIG. 13C.

FIG. 14 is an explanatory diagram for explaining a switching condition for switching to the fourth switching state, taking the node 42B as an example of the intermediate nodes 42M. As shown in part (A) of FIG. 14, in a case where the relay packet Pr (e.g., the relay packet Pr having the SID equal to D or C) transmitted from an upstream-side node 42 (e.g., node 42D or node 42C) according to the predetermined repeating pattern and having passed through the input-side communication line 82 is transferred to the output-side communication line 83 and where the transmission packet Pt output from the node 42B according to the predetermined repeating pattern and having the SID equal to B is transferred to the output-side communication line 83 but is not transferred (or not returned after circulating through the ring network) to the input-side communication line 82, the switch 80 determines (or assumes) that there is a communication error on a section of the first communication line 81 downstream thereof, and switches to the fourth switching state shown in part (B) of FIG. 14. Once the switch 80 has switched to the fourth switching state, the relay packet Pr having the SID equal to A and the transmission packet Pt having the SID equal to B received by the third reception port 85C are transferred to the input-side communication line 82 via the first transmission port 86A. Thereby, the transmission packet Pt having the SID equal to B is allowed to be transferred (returned) to the input-side communication line 82.

As each switch 80 is configured to switch the signal (packet) transfer path as described above, the controller 49 (FIG. 5) of each node 42 in the second ring network 40B, which serves as a communication error detector, is allowed to determine a part where a communication error occurs based on a change in the relationship between the number of relays (HOP) and the source node ID (SID).

It is to be noted, however, that the second switches 80B in the first and second ring networks 40A and 40B are configured such that when, in one of the first and second ring networks 40A and 40B, the communication line 41 between the node 42A and the node 42B (the first communication line 81 or the input-side communication line 82 for the node 42B) shown in FIG. 7 becomes broken or the node 42B undergoes failure, the second switches 80B open later-described redundant communication lines 87, and therefore, the second switches 80 do not perform the switching to the third switching state shown in part (B) of FIG. 12 or to the fourth switching state shown in part (B) of FIG. 14. In the following, such an operation of the second switches 80B will be described.

Figure 15:
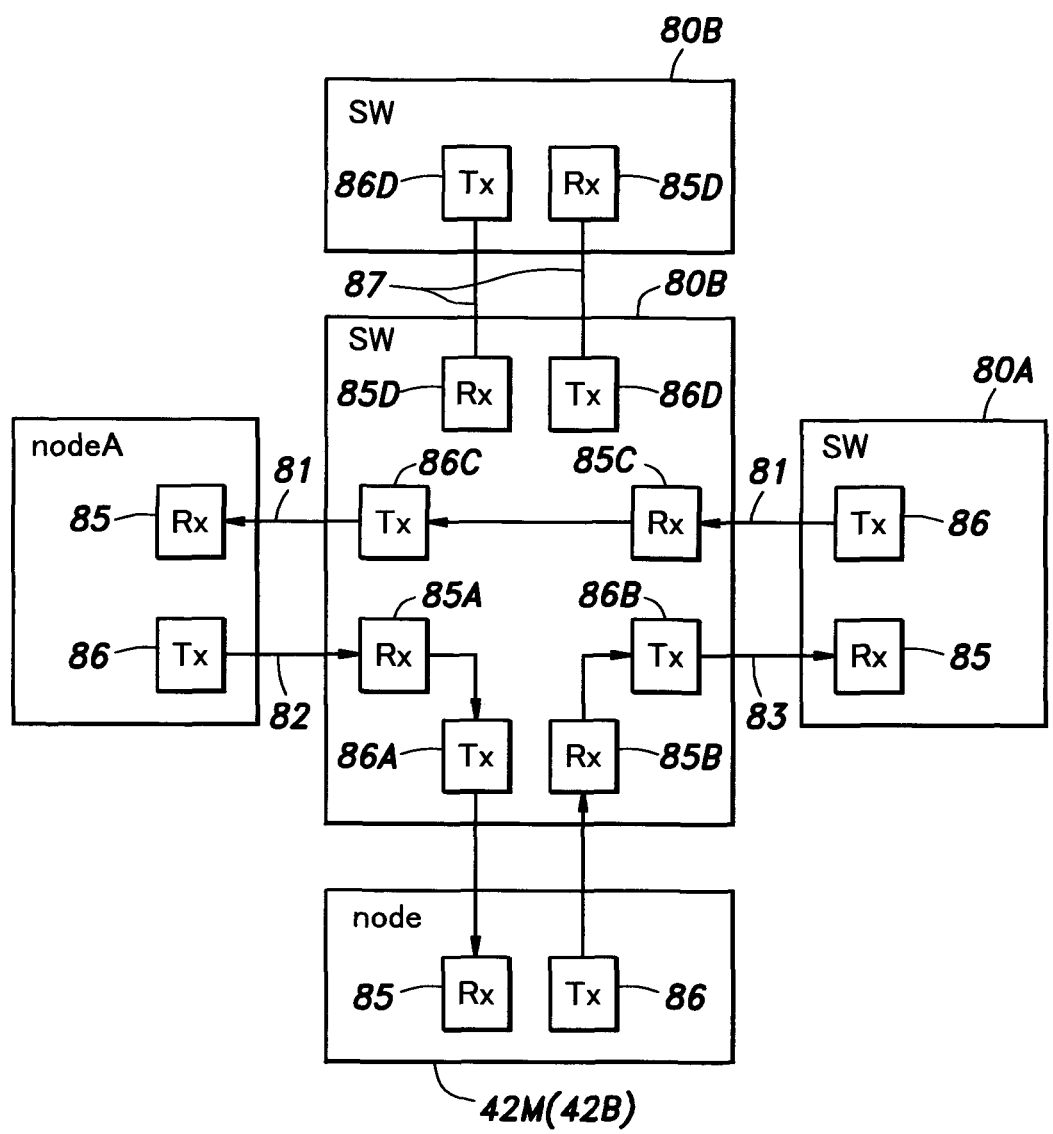
FIG. 15 is a schematic configuration diagram of a second switch shown in FIG. 7.

FIG. 15 is a schematic configuration diagram of the second switch 80B of the first ring network 40A. In addition to the structure explained with reference to FIGS. 8 to 12, the second switch 80B is further provided with a redundant (or spare) reception port 85D and a redundant (or spare) transmission port 86D, which are not connected to the regular ports (reception ports 85A to 85C and transmission ports 86A to 86C) in the switch 80B at normal time (or when there is no communication error in the ring network). The redundant reception port 85D is connected with a redundant communication line 87 which is connected to the redundant transmission port 86D of the second switch 80B in another ring network 40 (in this embodiment, the second ring network 40B). The redundant transmission port 86D is connected with a redundant communication line 87 which is connected to the redundant reception port 85D of the second switch 80B in the other ring network 40.

As shown in FIG. 5, the node 42A in each ring network 40 (40A, 40B) is configured such that when the controller 49 thereof detects a communication error in the own ring network 40 and determines that the detected communication error is caused by a break of the communication line 41 between the node 42A and the node 42B or a failure of the node 42B, the node 42A transfers a switch control signal Ss in the form of a packet P to the node 42A (which acts as the host node) of another ring network 40, wherein the switch control signal Ss includes data D for causing the redundant ports (85D, 86D) of the second switches 80B and the redundant communication lines 87 connected thereto to open such that at least one node 42 in the one ring network 40 is incorporated in the other ring network 40. It is to be noted that in FIG. 5, an arrow extending from the controller 49 to the data generator 48 is labeled with a symbol "Ss" for the purpose of convenience of explanation, but actually, the switch control signal Ss is generated by the data generator 48, and the controller 49 serving as a communication error detector notifies the data generator 48 of the detection of a communication error and the location where the communication error has occurred.

Further, the controller 49 of the node 42A in each ring network 40 is configured such that when the controller 49 receives the switch control signal Ss from the node 42A of another ring network 40, the controller 49 transfers the received switch control signal Ss onto the own ring network 40. For example, when the controller 49 of the node 42A in the first ring network 40A shown in FIG. 7 transfers the switch control signal Ss to the node 42A of the second ring network 40B, the node 42A of the second ring network 40B that received the switch control signal Ss transfers the received switch control signal Ss onto the second ring network 40B.

Figure 16:
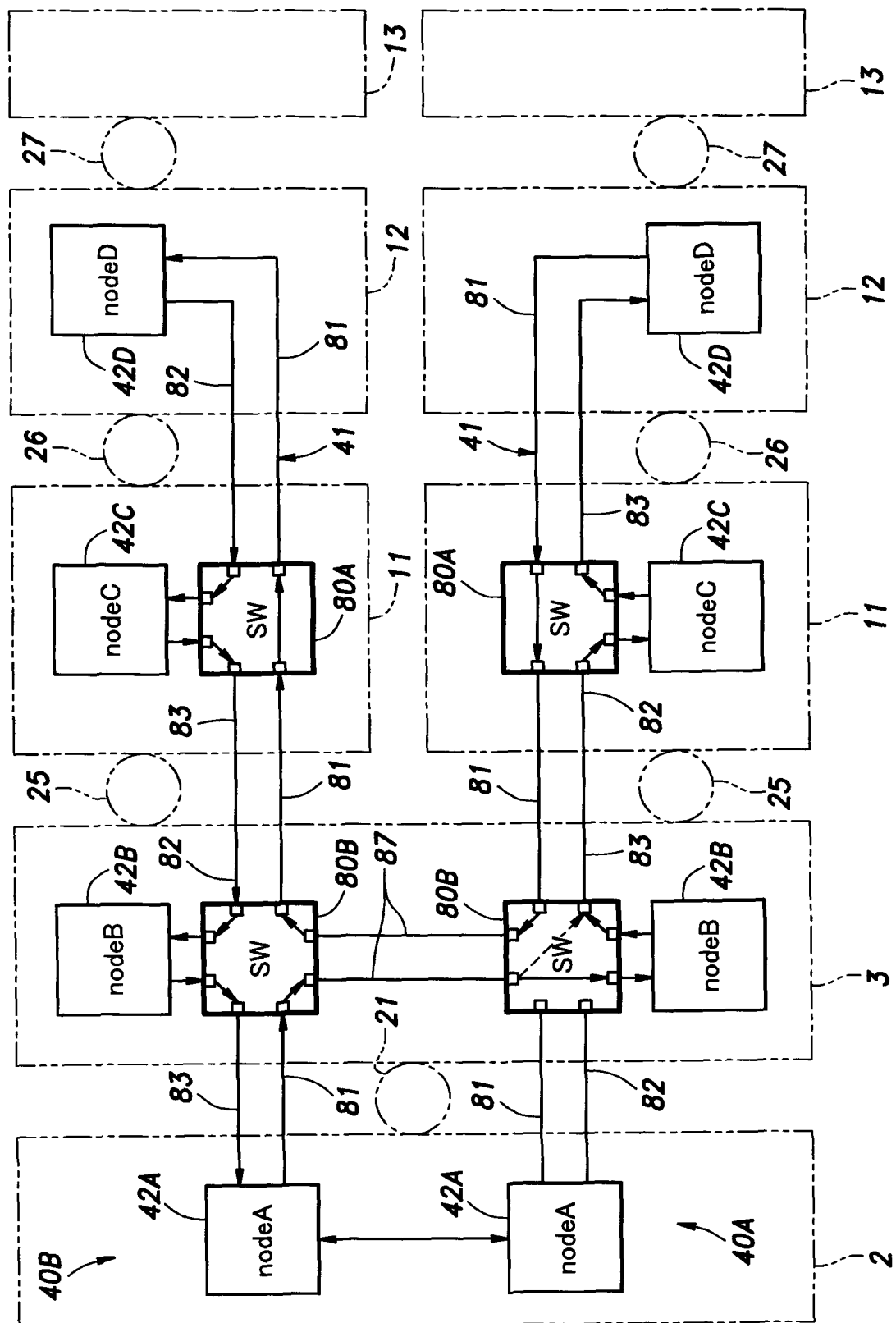
FIG. 16 is an explanatory diagram for explaining the switching states of the first and second ring networks shown in FIG. 7.

In response to the switch control signal Ss transferred onto the second ring network 40B, the second switch 80B of the second ring network 40B switches its state to connect the sections of the first communication line 81 connected thereto at the third reception port 85C and the third transmission port 86C, respectively, to the redundant transmission port 86D and the redundant reception port 85D, respectively, as shown in FIG. 16. Further, the switch control signal Ss is transferred to the second switch 80B of the first ring network 40A via one of the opened redundant communication lines 87, and the second switch 80B of the first ring network 40A that has received the switch control signal Ss switches its state to disconnect the node A42A from the first ring network 40A, and the remaining part of the first ring network 40A is connected to the second ring network 40B via the redundant communication lines 87 via the redundant ports 85D, 86D, as also shown in FIG. 16 by solid line arrows in the second switch 80B in the first ring network 40A). Specifically, the switch 80B of the first ring network 40A changes its state to internally connect the redundant reception port 85D and the redundant transmission port 86D to the first transmission port 86A and the third reception port 85C, respectively, as shown in FIG. 16. Thereby, the second ring network 40B is reconfigured such that at least one node (in the example shown in FIG. 16, node 42B to node 42D) downstream of the node 42A in the first ring network 40A is incorporated in the second ring network 40B, and the incorporated nodes 42 are allowed to operate under the command of the node 42A of the second ring network 40B.

It is to be noted that in a case where the node 42B in the first ring network 40A undergoes a failure, the second switch 80B in the first ring network 40A may switch its state as shown by a broken line arrow in FIG. 16 such that the node 42C and the node 42D of the first ring network 40A are incorporated in the second ring network 40B.

As described above, when a communication error occurs in the first ring network 40A, at least one node 42 in the first ring network 40A is incorporated in the second ring network 40B (another ring network) via the second switches 80B provided in the two ring networks and the redundant communication lines 87 connecting the second switches 80B to each other, and therefore, the affect on the system of the robot 1 caused by the communication error can be reduced. In addition, because it is unnecessary to provide the redundant communication lines 87 along the entire ring of each of the first ring network 40A and the second ring network 40B, the communication lines can be routed in narrow spaces easily.

Particularly, in the present embodiment, because the second switches 80B of the first and second ring networks 40A, 40B and the redundant communication lines 87 connecting the second switches 80B to each other are provided on the hip 3 constituting the main body of the robot 1, the routing of the communication lines is easy. In addition, when the communication error occurs between the node 42A and the node 42B in the first ring network 40A provided for control of the right leg 6, the node 42B, node 42C, and node 42D in the first ring network 40A, which are provided on the hip 3, the thigh 11, and the lower leg 12, respectively, are incorporated in the second ring network 40B for control of the left leg 6 via the second switches 80B and the redundant communication lines 87 provided on the hip 3, whereby the nodes 42B to 42D are allowed to operate under the command of the node 42A (acting as the host node) in the second ring network 40B, and hence, the affect on the system of the robot 1 caused by the communication error can be reduced.

Next, with reference to FIG. 17, description will be made of the third ring network 40C in the communication system provided in the robot 1.

Figure 17:
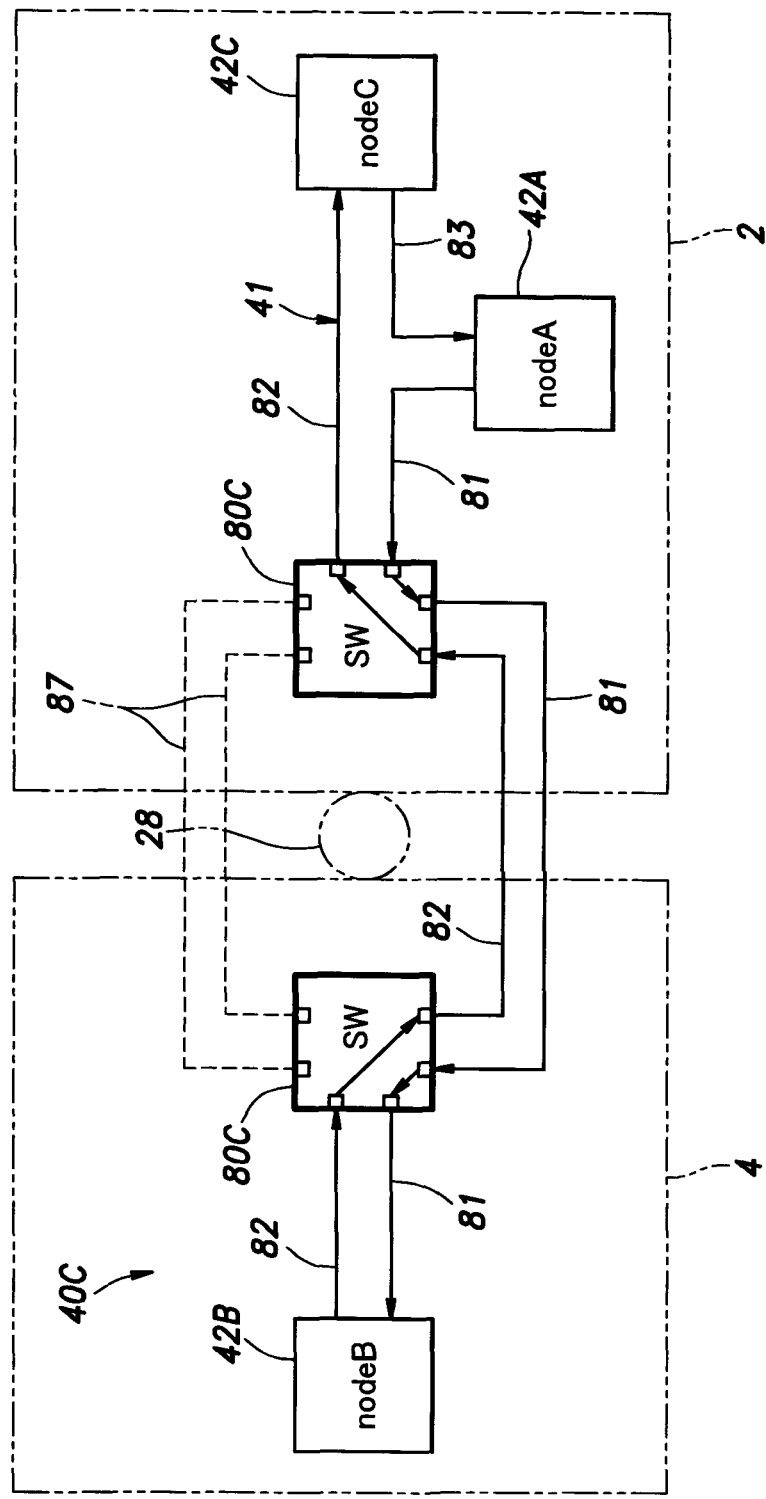
FIG. 17 is a schematic configuration diagram of a third ring network shown in FIG. 3.

As shown in FIG. 17, two third switches 80C are provided on the communication lines 41 of the third ring network 40C comprising three nodes 42. The node 42A acting as the host node and the node 42B located at the closest position from the node 42A in the downward direction are connected with each other by a first communication line 81. The node 42C, which is provided downstream of the node 42B and between the node 42B and the node 42A and thus may be referred to as an intermediate node 42M, is connected to the upstream node 42B by an input-side communication line 82 and to the downstream node 42A by an output-side communication line 83. The first communication line 81 is provided to pass near the input-side communication line 82 and the output-side communication line 83 for the node 42C.

The two third switches 80C are provided on the first communication line 81 and the input-side communication line 82 for the node 42C, and distributedly arranged on the torso 2 and the head 4. Namely, the two third switches 80C are provided to interpose the neck joint 28 therebetween. It is to be noted that the signal transfer direction in the third ring network 40C may be reversed from that shown in FIG. 17.

Figure 18:
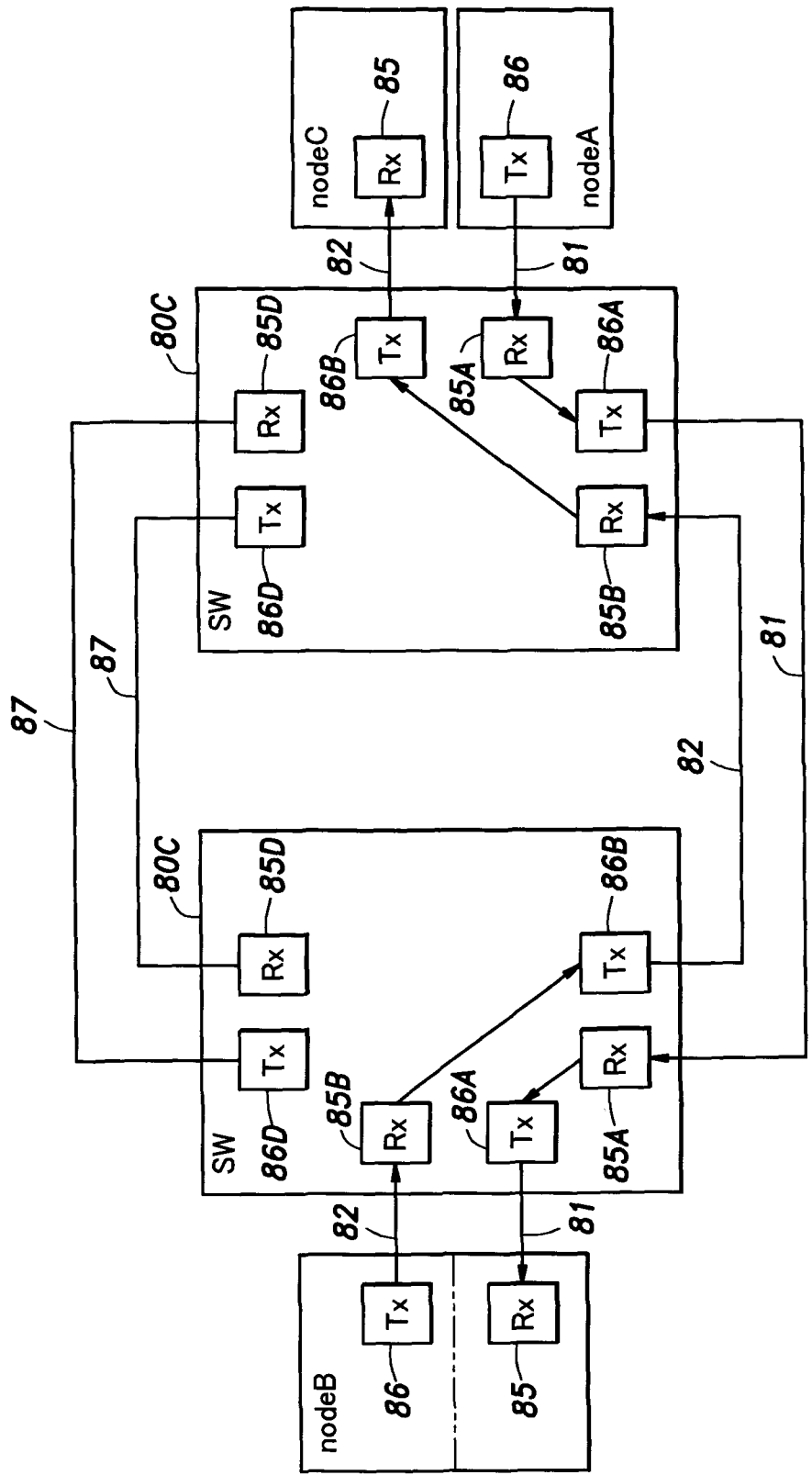
FIG. 18 is a schematic configuration diagram of third switches shown in FIG. 17.

FIG. 18 is a schematic configuration diagram of the third switches 80C. As shown in FIG. 18, each third switch 80C is provided with two reception ports 85 (first and second reception ports 85A, 85B) and two transmission ports 86 (first and second transmission ports 86A, 86B). The first reception port 85A of each third switch 80C is connected with a section of the first communication line 81 that is connected to the transmission port 86 (Tx) of the node 42A or the other switch 80C located on the upstream side. The first reception port 85A and the first transmission port 86A of each right-side third switch 80C are internally connected to each other. The first transmission port 86A of each third switch 80C is connected to the reception port 85 (Rx) of the other third switch 80C or the node 42B located on the downstream side by a section of the first communication line 81 extending therebetween. The second reception port 85B is connected with a section of the input-side communication line 82 that is connected to the transmission port 86 (Tx) of the node 42B or the other third switch 80C located on the upstream side. The second reception port 85B and the second transmission port 86B of each third switch 80C are internally connected to each other. The second transmission port 86B is connected to the reception port 85 of the node 42A or the third switch 80C located on the downstream side by a section of the communication line 82 extending therebetween.

Each third switch 80C is further provided with a redundant reception port 85D and a redundant transmission port 86D, which are not connected to the reception ports 85A, 85B and the transmission ports 86A, 86B in the switch 80C at normal time. The redundant reception port 85D of each third switch 80C is connected with a redundant communication line 87 that is connected to the redundant transmission port 86D of the other third switch 80C.

Figure 19:
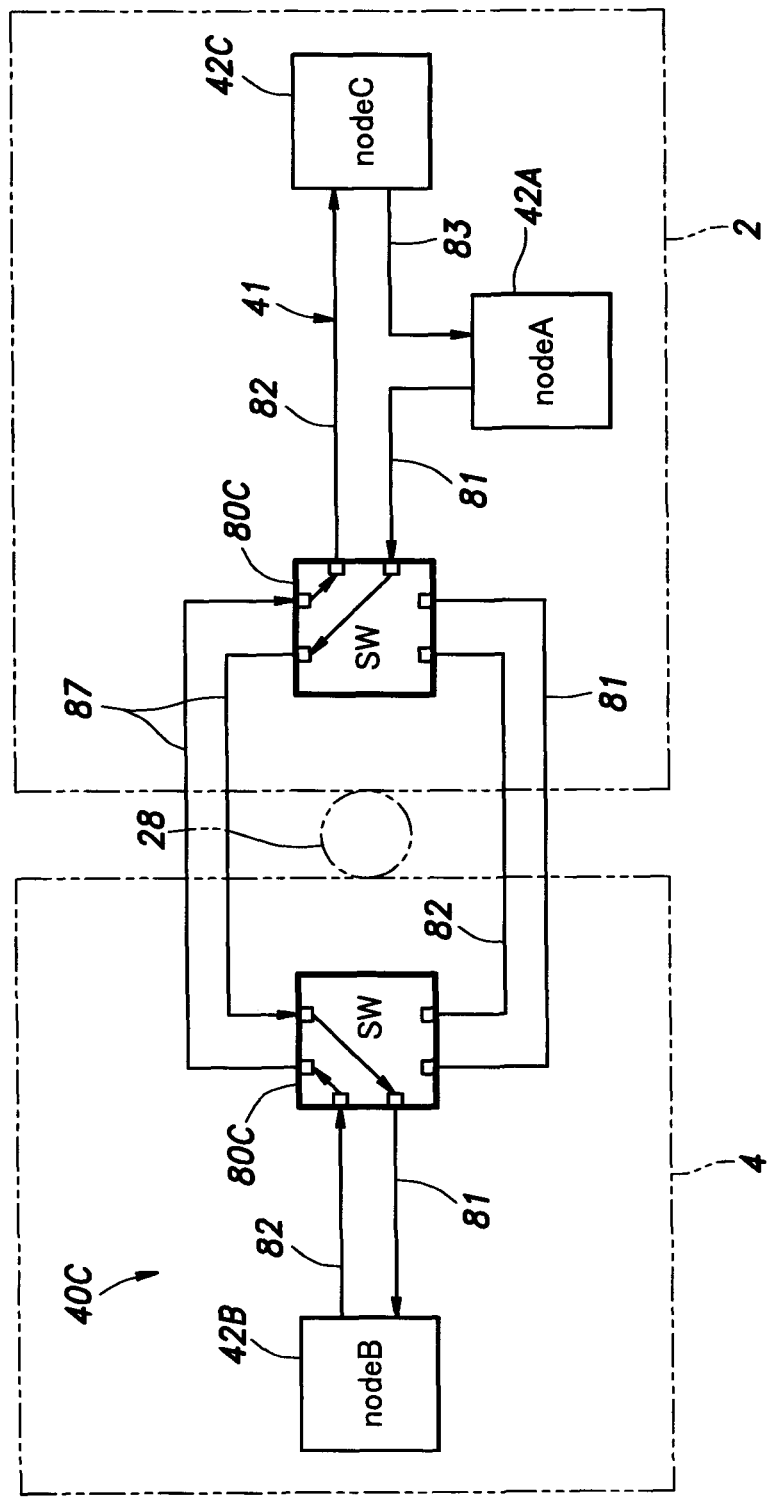
FIG. 19 is an explanatory diagram for explaining the switching states of the third ring network shown in FIG. 17.

As shown in FIG. 19, the node 42A in the third ring network 40C is configured such that when the controller 49 thereof detects a communication error in the third ring network 40C and determines that the detected communication error is caused by a break of the communication line 81 or 82 between the node 42A and the node 42B, the controller 49 of the node 42A transfers (or causes the data generator 48 to output) a switch control signal Ss in the form of a packet P onto the third ring network 40C, wherein the switch control signal Ss includes data for causing the redundant ports (85D, 86D) of the third switches 80C and the redundant communication lines 87 connected thereto to open.

In response to the switch control signal Ss transferred onto the third ring network 40C, the third switches 80C of the third ring network 40C switch their states such that the right-side third switch 80C internally connect the section of the first communication line 81 for connection with the node 42A to the redundant transmission port 86D and the section of the communication line 82 for connection with the node 42C to the redundant reception port 85D, and the left-side third switch 80C internally connects the section of the first communication line 81 for connection with the node 42B to the redundant reception port 85D and the section of the communication line 82 for connection with the node 42B to the redundant transmission port 86D, as shown in FIG. 19. Thereby, the node 42A and the node 42B are connected to each other via the redundant communication lines 87, and the third ring network 40C is reconstructed.

As described above, in the third ring network 40C, even when a communication error occurs between the node 42A and the node 42B, the communication lines 41 connected in the ring shape can be reconstructed by switching of the two third switches 80C, and thus, the communication between the node 42A acting as the host node and the node 42B can be performed continuously.

The preferred embodiments of the present invention have been described in the foregoing, but the present invention is not limited to the foregoing embodiments and various alterations and modifications are possible without departing from the scope of the present invention. For example, the concrete structure, arrangement, number, etc. of the component parts of the embodiments and the concrete processing procedures in the embodiments may be appropriately changed within the scope of the present invention. Also, not all of the structural elements shown in the above embodiments are necessarily indispensable and they may be selectively used as appropriate.

The invention claimed is:

1. A communication system including a plurality of ring networks each including a plurality of nodes communicably connected to each other by communication lines and configured to send data in only one direction along the communication lines,
wherein each of the plurality of ring networks comprises:
a host node serving as an upper controller for other nodes in one ring network of the plurality of ring networks, the host node being configured to be capable of communicating with the host node of another ring network not via the other nodes of the one ring network;
a first node connected with the host node via a first communication line;
an intermediate node provided between the host node and the first node and connected with an immediately upstream node via an input-side communication line and with an immediately downstream node via an output-side communication line, the first communication line being provided to pass near the input-side communication line and the output-side communication line; and
a switch provided in association with the intermediate node in the one ring network of the plurality of ring networks and having a plurality of regular ports which are switchably connected to one another in the switch and are each connected with one of sections of the first communication line, the input-side communication line, and the output-side communication line, and a plurality of redundant ports which are not connected to the regular ports in the switch at normal time,
wherein the redundant communication ports of the switch in each ring network are connected to the redundant communication ports of the switch in the other ring network via redundant communication lines,
wherein the host node in each ring network comprises a communication error detector configured to detect a communication error in the one ring network of the plurality of ring networks of the communication system,
wherein the host node in each ring network is configured such that, when a communication error is detected by the communication error detector, the host node transmits a switch control signal to the host node of the other ring network to control the switch of each of the one ring network of the plurality of ring networks and the other ring network to connect the redundant ports thereof to some of the regular ports thereof such that at least one node in the one ring network of the plurality of ring networks is incorporated in the other ring network via the redundant communication lines, and
wherein the host node in each ring network is configured such that, when the host node receives the switch control signal from the host node of the other ring network, the host node transmits the received switch control signal to the switch in the one ring network of the plurality of ring networks to control the switch to connect the redundant ports thereof to some of the regular ports thereof and transmits the switch control signal to the other ring network to control the switch of the other ring network to connect the redundant ports thereof to some of the regular ports thereof such that at least one node of the other ring network is incorporated in the one ring network of the plurality of ring networks via the redundant communication lines.

2. A robot comprising the communication system as defined in claim 1 and a plurality of parts driven by the plurality of ring networks of the communication system.

3. The robot as defined in claim 2, further comprising a main body and a plurality of multi-link mechanisms each having a plurality of links connected in series via a plurality of joints such that one end of the series-connected links is joined to the main body,
wherein the nodes of each of the plurality of ring networks are distributedly arranged on the main body and the plurality of links of a corresponding one of the plurality of multi-link mechanisms, and the switches and the redundant communication lines of the plurality of ring networks are provided on the main body.

\* \* \* \* \*

UNITED STATES PATENT AND TRADEMARK OFFICE
CERTIFICATE OF CORRECTION

PATENT NO. : 10,742,444 B2
APPLICATION NO. : 16/213216
DATED : August 11, 2020
INVENTOR(S) : Ryusuke Ishizaki It is certified that error appears in the above-identified patent and that said Letters Patent is hereby corrected as shown below:

On the Title Page

In item (54), in Title, delete "ROB OT" and insert therefor -- ROBOT --.

Signed and Sealed this
Seventeenth Day of November, 2020

Andrei Iancu
*Director of the United States Patent and Trademark Office*